(12) United States Patent
Miles et al.

(10) Patent No.: US 7,529,697 B2
(45) Date of Patent: May 5, 2009

(54) APPARATUS AND METHOD FOR IDENTIFICATION OF TRANSMISSIONS AND OTHER PARTS

(75) Inventors: David Miles, Edmond, OK (US); David Arney, Piedmont, OK (US)

(73) Assignee: ATC Drivetrain, Inc., Downers Grove, IL (US)

( * ) Notice: Subject to any disclaimer, the term of this patent is extended or adjusted under 35 U.S.C. 154(b) by 1099 days.

(21) Appl. No.: 10/444,462

(22) Filed: May 22, 2003

(65) Prior Publication Data
US 2004/0064384 A1    Apr. 1, 2004

Related U.S. Application Data

(60) Provisional application No. 60/383,350, filed on May 24, 2002.

(51) Int. Cl.
*A01K 5/02* (2006.01)
*G06Q 10/00* (2006.01)

(52) U.S. Cl. ................... 705/29; 705/28; 703/1; 700/103

(58) Field of Classification Search .............. 705/28
See application file for complete search history.

(56) References Cited

U.S. PATENT DOCUMENTS

| | | | | |
|---|---|---|---|---|
| 4,682,365 A | * | 7/1987 | Orita et al. | 382/159 |
| 4,731,860 A | * | 3/1988 | Wahl | 382/281 |
| 4,736,809 A | * | 4/1988 | Kumazawa | 180/339 |
| 5,299,116 A | | 3/1994 | Owens et al. | 364/403 |
| 5,987,474 A | * | 11/1999 | Sandifer | 707/104.1 |

(Continued)

OTHER PUBLICATIONS

Controls, Power transmission equipment, automatic identification products; 1990-91 Handbook and Directory; Material Handling Engineering, vol. 44, No. 13, p. A117(4), Annual 1990.*

(Continued)

*Primary Examiner*—F. Zeender
*Assistant Examiner*—Faris Almatrahi
(74) *Attorney, Agent, or Firm*—David W. Carstens; Carstens & Cahoon, LLP

(57) ABSTRACT

A system and method is provided for identifying an unknown object from an object class such as transmissions, engines, and other parts. The system utilizes a classification scheme configured to distinguish objects of the object class based upon variations observable through visual inspection. In many instances, these variations can be relatively obscure. In use, the system presents sets of options for selection by a user. Each set is directed to a particular feature for distinguishing objects of the object class, and each option represents a distinct configuration for the corresponding feature. The system receives a selection of one of the options from each set of options presented that corresponds to a feature found on the unknown object. Once the system receives sufficient information in accordance with the classification scheme, it presents an identification for the unknown object. Beneficially, identification is accomplished through visual inspection of the unknown object without disassembly or need of substantial familiarity with the system or objects of the object class. In a preferred embodiment, the classification scheme directed to an object class of transmissions and is implemented in decision tree structure in which the sets of options are presented sequentially.

18 Claims, 35 Drawing Sheets

U.S. PATENT DOCUMENTS

| | | | | |
|---|---|---|---|---|
| 6,002,854 | A | * | 12/1999 | Lynch et al. .................... 703/1 |
| 6,122,042 | A | * | 9/2000 | Wunderman et al. .......... 356/73 |
| 6,182,053 | B1 | | 1/2001 | Rauber et al. ................. 705/28 |
| 6,325,283 | B1 | | 12/2001 | Chu et al. ................... 235/375 |
| 6,339,764 | B1 | | 1/2002 | Livesay et al. ................ 705/28 |
| 2002/0138374 | A1 | * | 9/2002 | Jennings et al. ............... 705/29 |
| 2003/0072484 | A1 | * | 4/2003 | Kokko et al. ................ 382/155 |

OTHER PUBLICATIONS

Masri, Bassam Mohamad; Spare Parts Management and Inventory Control (Lot Sizing), 1996, Universite Laval (Canada), vol. 35/03 of Masters Abstracts, p. 873.*

Zeisloft, Dave; Methods of Product Identification for Automated Bar Code Tracking; Dec. 1, 1987; Cahners Exposition Group.*

XSIS Customer Profiles, Web site printout at http://www2.xerox.com/xsis/cust2pro.htm, dated Oct. 21, 2002.

* cited by examiner

Autocraft Transmission
Core Identification ⟵ 24

Click Here to Continue ⟵ 26

For Printer Friendly Version of this Web Site Click Here
Requires Adobe Acrobat

FIG. 3A

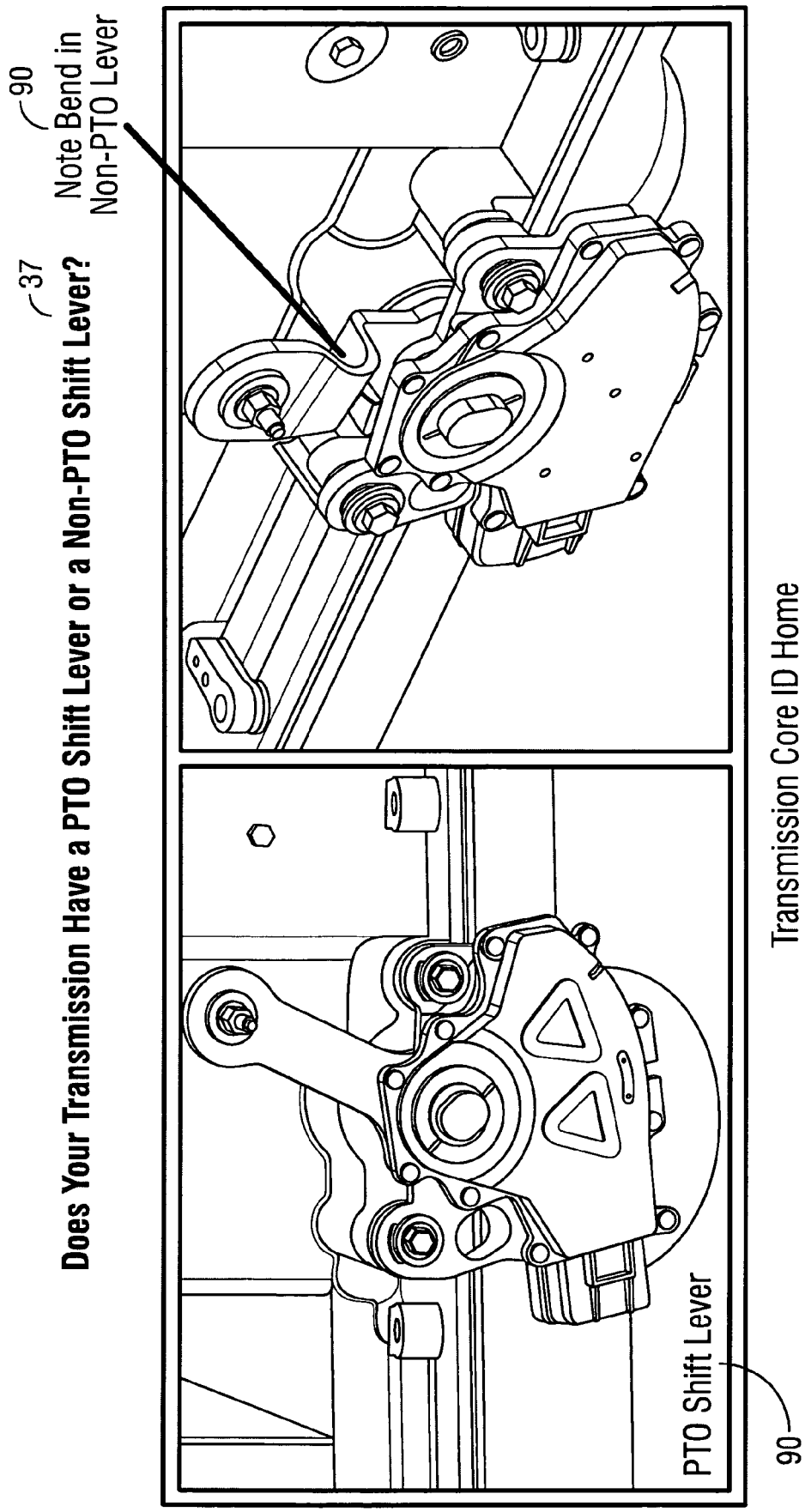

Does Your Transmission Core Have a Large Seal with a Tube in the Extension Housing? /―37

Does Your Transmission Core Have a Flat Top Mounting? /―37

Does Your Transmission Core Have 0 or 2 Sensors?

Transmission Core ID Home

Choose Housing Type?

Transmission Core ID Home

APPARATUS AND METHOD FOR IDENTIFICATION OF TRANSMISSIONS AND OTHER PARTS

CROSS-REFERENCE TO RELATED APPLICATION

This application claims the benefit of U.S. Provisional Application No. 60/383,350 filed May 24, 2002.

BACKGROUND OF THE INVENTION

This invention relates generally to identification of objects and, more particularly, to a system and method for identifying manufactured parts, such as transmissions, through visual inspection.

When manufactured goods fail, they can often be repaired. For example, when an automotive part such as a transmission or engine fails, typically only a few components of the part require replacement, whereas the rest of the automotive part remains operable. Correct identification of the failed part is imperative if repair is to be successful. However, parts are frequently misidentified, resulting in economic loss of considerable magnitude, particularly when the part is complex, as in machinery.

In the automotive field, failed parts are frequently sent to facilities owned by third parties that remanufacture, refurbish, or repair failed parts. Such facilities receive a substantial number and variation of automotive parts for repair. For example, a typical repair facility may refurbish many thousands of transmissions per year. In addition, such facilities are typically configured to handle several hundred different variations of transmissions. Thus, a critical aspect of the refurbishment process is to properly identify and sort the failed parts. Correct identification of failed parts is also important to insure that the cost of repairing parts is correctly allocated among the owner of the part and the repair facility. Today, losses sustained due to misidentification are in the millions of dollars each year. The problem of misidentification is exacerbated by the practice of shipping failed parts to third party repair facilities, because a misidentified part is worthless when sent to a facility that is not equipped to repair that part.

Automobile transmissions, as well as other kinds of complex machinery, are identifiable by indicia stamped or otherwise marked on the part. However, this information is generally not known or understood by the workers who repair the parts at the repair facility. While some parts may be identified by labels affixed to them by the manufacturer, it is often true that parts cannot be identified in this manner. For example, not all parts are marked with a part number. Moreover, on a certain percentage of parts received for refurbishment, labels once present are unreadable or missing entirely, thereby requiring identification by other means.

Other techniques for identification of parts require familiarity with the replacement parts, including model numbers and variants. Such techniques are impractical when the parts are complex. In some instances, it is simply impractical to identify unmarked parts, resulting in an ineffective use of materials and creating environmental concerns. Similar issues arise in the refurbishment of other parts, such as engines, braking assemblies, and the like.

An additional issue addressed by the present invention is the need to accurately credit and value parts sent to third parties for refurbishment. As previously mentioned, when a major assembly, such as a transmission, engine or brake assembly, fails, the entire assembly is removed and replaced with a previously refurbished assembly. The removed, failed assembly is generally shipped to a third party business for repair. The original manufacturer of the assembly credits the third party repair facility for the residual value of the repaired part—in effect, purchasing the repaired assembly—for subsequent resale to authorized vendors of repaired parts. The residual value of a failed assembly is referred to in the automotive industry as the "core charge" for the assembly or part, as the case may be. The part or assembly may be referred to simply as the "core." It is apparent that misidentification of failed parts and assemblies in the above-described process results in considerable economic loss to the manufacturers if the core charge is credited to the repair facility but repair is impossible because the part, through misidentification, has been sent to a facility not equipped to repair that part.

It is therefore evident that there is a need for a cost-effective approach for identifying manufactured objects in an efficient and accurate manner while at the same time improving accountability. Such an approach would have particular application to the automotive industry for identification of parts used in automotive transmissions, engines and brake assemblies. The present invention fulfills these needs and others.

SUMMARY OF THE INVENTION

The present invention relates to a system and method for efficient identification of parts for manufactured objects, such as transmissions, engines and other parts. The system utilizes a classification scheme designed to identify a particular object (i.e., an unknown object) of a class of related objects through visual inspection.

In many instances, features that distinguish similar parts are difficult to locate. In one preferred embodiment of the invention, a system includes visual cues which assist a user in locating the features used to identify a part. In operation, the system presents the user with sets of options directed to features which distinguish parts, each such set is presented to a user in accordance with the logic of the classification scheme.

The user selects the option from among those presented that best matches the object requiring identification. Once the system receives sufficient information, it presents an identification for the unknown object based upon the selections received and in accordance with the classification scheme.

In one preferred embodiment of the invention, the classification scheme is a hierarchical decision tree directed to identification of transmission cores by sets of options that are presented sequentially.

In another aspect of a preferred embodiment, each set of options includes an image of an object representative of he object class to assist a user in locating a distinguishing feature on the object. The system further provides indicia for assisting the user in locating such distinguishing features.

In a further aspect of a preferred embodiment, numerical codes stamped or otherwise marked on components of parts, and referred to as a control parts locator may be used as indicia for identifying parts.

In another detailed aspect of a preferred embodiment, the system includes depictions of each of the features along with an indication of the location of the selected feature in the context of the object.

In yet another detailed aspect of a preferred embodiment, the system transmits information from at least one server to users by way of the Internet, or an intranet. Use of centrally-stored information broadcast to other facilities reduces the cost of information storage while allowing for rapid update of data without loss of security for proprietary information.

Although embodiments of the invention are illustrated and described with reference to parts for automobile transmissions, those skilled in the relevant fields will readily recognize application of the invention to other manufactured parts, for example, motorcycles, marine and aircraft parts, as well as electrical motors for industry and related controllers. Accordingly, the scope and applicability of the invention should be understood to be broader than the embodiments illustrated and disclosed herein.

Other features and advantages of the invention will become apparent from the following description of the preferred embodiments, taken in conjunction with the accompanying drawings, which illustrate, by way of example, the principles of the invention.

BRIEF DESCRIPTION OF THE DRAWINGS

Embodiments of the present invention will be described, by way of example only, with reference to the following drawings in which:

FIGS. 2B-1 and 2B-2 are continuations of the simplified hierarchical decision tree of FIG. 2A, depicting sets of options following selection of the first option from the first set of options.

FIGS. 2C-1 and 2C-2 are continuations of the simplified decision tree of FIG. 2A, depicting sets of options following selection of the second option of the first set.

FIGS. 2D-1, 2D-2, 2D-3, and 2D-4 are continuations of the simplified decision tree of FIG. 2A, depicting sets of options following selection of the third option of the first set.

FIG. 2D is a continuation of the simplified decision tree of FIG. 2A, depicting sets of options following selection of the third option of the first set.

FIGS. 2F-1, 2F-2, 2F-3, 2F-4, 2F-5, AND 2F-6 are continuations of the simplified decision tree of FIG. 2A, depicting sets of options following selection of the fifth option of the first set.

FIGS. 2G-1, 2G-2, and 2G-3 are continuations of the simplified decision tree of FIG. 2A, depicting sets of options following selection of the sixth option of the first set.

FIG. 3A is a home page received from the application server of FIG. 1. Selecting icon 26 initiates a method of identifying a transmission by executing the decision tree of FIGS. 2A-2G.

FIG. 4A is a Web page that corresponds to sets of options represented by boxes "Shift lever (PTO)" and "Shift lever (non PTO)" of the classification scheme of FIGS. 2A-2G.

FIG. 5 is a simplified hierarchical decision tree implementing a second preferred embodiment of a classification scheme in accordance with the present invention.

DETAILED DESCRIPTION OF THE PREFERRED EMBODIMENTS

In this section, the invention is described in detail with regard to the figures briefly described above. As such, the following terms are used throughout the description. For purposes of construction, such terms shall have the following meanings:

The term "classification scheme," unless otherwise specified, refers to a systematic, organized framework for classifying objects based upon visual characteristics of the objects that distinguish them from one another.

The terms "class of objects" and "object class," unless otherwise specified, refer to a grouping of objects which the classification scheme is designed to identify. For example, transmissions, braking assemblies and engines can each be an object class. Transmissions from a particular manufacturer can also be an object class.

The terms "category of objects" and "object category," unless otherwise specified, refer to a subset of the object class in which the classification scheme groups the objects. For example, a part-number grouping such as E9TZNRM and a make/model grouping can be an object category of an object class comprising transmissions.

The term "feature," unless otherwise specified, refers to a detail or component that exists on objects across at least two categories of objects in which the detail or component is configured differently, thereby serving as a distinguishable visual characteristic upon which the classification scheme is organized. Each option represents a distinct configuration of the corresponding feature. For example, the number cast on the bell housing of a transmission can be a feature, and a cast number of "1" or "2" would be options corresponding to that feature.

The term "unknown object" refers to an unidentified object that is to be identified by the system.

Figure 1:
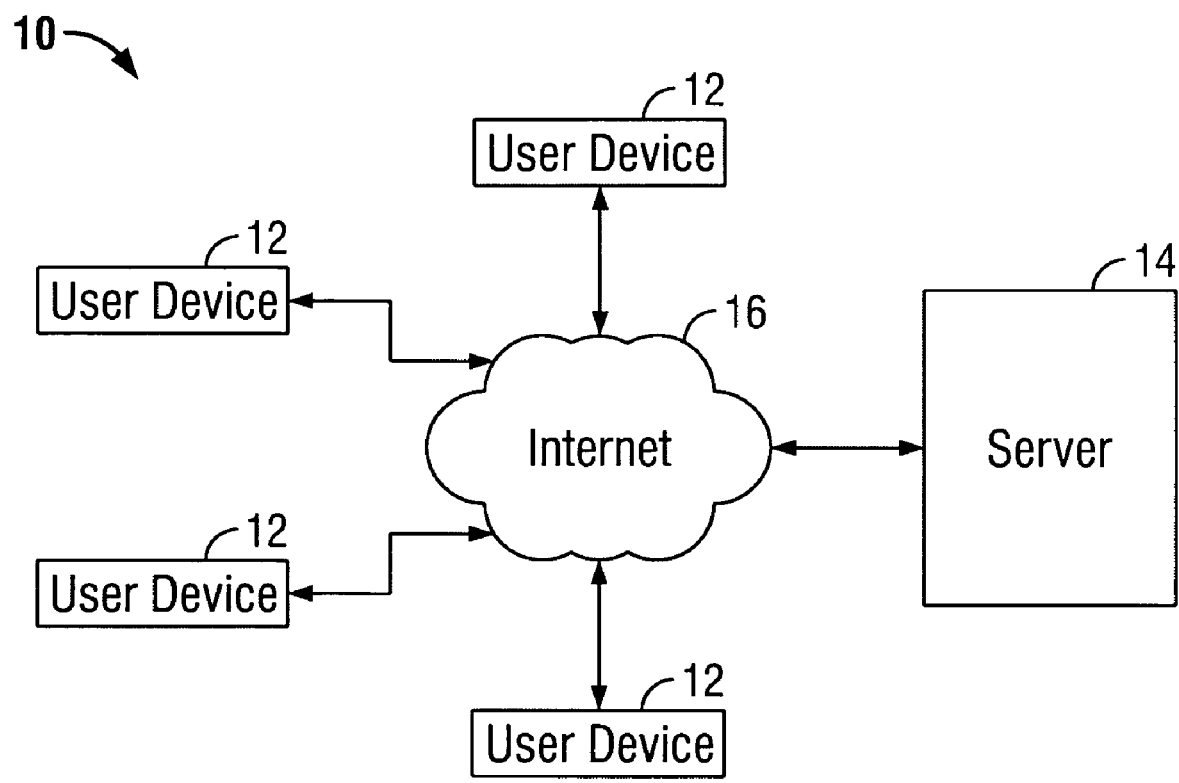
FIG. 1 is a simplified block diagram of an identification system in accordance with the present invention. Several user devices are shown in communication with a server by way of the Internet.

With reference now to the illustrative drawings, and particularly to FIG. 1, there is shown a simplified block diagram of an object identification system 10 including user devices 12 and application server 14 in communication with one another, e.g., via Internet 16. In preferred embodiments, user devices 12 are personal digital assistants with Internet connections, such as those available from Palm, Inc., and others. Any Web-enabled device capable of displaying images, such as a handheld device or cell phone that displays images, can be a user device.

When presented with an unknown object, a user of the system 10 interfaces with the system by way of one of the user devices 12. The system presents the user with sets of options relating to characteristics for distinguishing different objects of a relevant object class. Based upon the user's responses, the system identifies the unknown object through a classification scheme. Identification of unknown objects is accomplished through visual inspection of the transmission or other object without disassembly or need of substantial experience in identification of such objects.

With reference now to FIGS. 2A-2G, the classification scheme takes the form of a hierarchical decision tree 18 in which sets of options are presented sequentially. The decision tree may be defined as a map for the reasoning process. The decision tree guides a user of the system 10 by providing limited choices to be made at predetermined points or nodes. The structure of the decision tree reflects the relationship between the components of parts. Specifically, the relationships embodied by decision trees according to the invention are determined through detailed and careful study of a part and the relationship of its components to one another. Thus, the identification process is significantly simplified, and does not require specialized knowledge for successful use.

For each set of options presented by the decision tree 18, a user is directed to inspect a particular feature of the unknown object and to select an option that corresponds to a feature found on the unknown object. Often, distinctions in configurations of the features presented may be difficult to locate. The system 10 is therefore configured to provide text and visual cues to aid the user in locating and distinguishing the various configurations of such features. Based upon the user's response, the system presents a subsequent set of options directed at another feature of the unknown transmission. The system continues to present sets of options corresponding to the logic of the decision tree until the unknown object is identified. In this manner, the system aids the user in quickly and accurately identifying the unknown transmission. Although in the present embodiment the system presents the sets of options sequentially, it will be appreciated that sets of options can be presented simultaneously without departing from the invention.

In the specific embodiment disclosed herein, the decision tree 18 is configured to identify transmissions from E4OD and 4R100 classifications of transmissions, as used in vehicles manufactured by the Ford Motor Company. Each branch of the decision tree terminates in a part-number grouping, i.e., an object category, for identifying the unknown transmission. In some instances, an object category may consist of a single part number. As listed in Table 1, there are 96 object categories within this object class comprising more than 200 part numbers. All of the object categories are depicted in the decision tree.

TABLE 1

Transmission Object Class

| Models | Number of Object Categories | Part Number Totals |
|---|---|---|
| E4OD Models | | |
| E4OD 4.9/5.0/5.8 4x2 1989-1991 | 2 | 9 |
| E4OD 4.9/5.0/5.8 4x2 1992-1997 | 6 | 24 |
| E4OD 4.9/5.0/5.8 4x4 1989-1991 | 2 | 4 |
| E4OD 4.9/5.0/5.8 4x4 1992-1997 | 3 | 11 |
| E4OD 7.3 4x2 1989-1991 | 2 | 4 |
| E4OD 7.3 4x2 1992-1997 | 10 | 14 |
| E4OD 7.3 4x4 1989-1991 | 2 | 3 |
| E4OD 7.3 4x4 1992-1997 | 5 | 8 |
| E4OD 7.3 SD 4x2 1989-1991 | 2 | 3 |
| E4OD 7.3 SD 4x2 1992-1997 | 2 | 3 |
| E4OD 7.5 4x2 1989-1991 | 1 | 4 |
| E4OD 7.5 4x2 1992-1997 | 6 | 13 |
| E4OD 7.5 4x4 1989-1991 | 2 | 2 |
| E4OD 7.5 4x4 1992-1997 | 2 | 3 |
| E4OD 7.5 SD 4x2 1989-1991 | 4 | 4 |
| E4OD 7.5 SD 4x2 1992-1997 | 3 | 10 |
| 4R100 Models | | |
| 4R100 5.4/6.8 4x2 1997-2001 | 14 | 48 |
| 4R100 5.4/6.8 4x4 1997-2001 | 9 | 22 |
| 4R100 6.8 4x2 PTO 1998-2001 | 2 | 3 |
| 4R100 6.8 4x4 PTO 1998-2001 | 2 | 3 |
| 4R100 7.3 4x2 1998-2001 | 4 | 7 |
| 4R100 7.3 4x4 1998-2001 | 4 | 3 |
| 4R100 7.3 4x2 PTO 1998-2001 | 2 | 2 |
| 4R100 7.3 4x4 PTO 1998-2001 | 2 | 2 |
| 4R100 7.3 4x2 SD 1998-2001 | 3 | 2 |
| Totals: | 96 | 201 |

It should be understood that the approach disclosed in detail herein is applicable to different families of transmissions made by different manufacturers, as well as to different objects. Thus, the following detailed description is presented as an example, illustrating how the invention may be used, and should not be understood as limiting the scope of the invention.

Figure 2A:
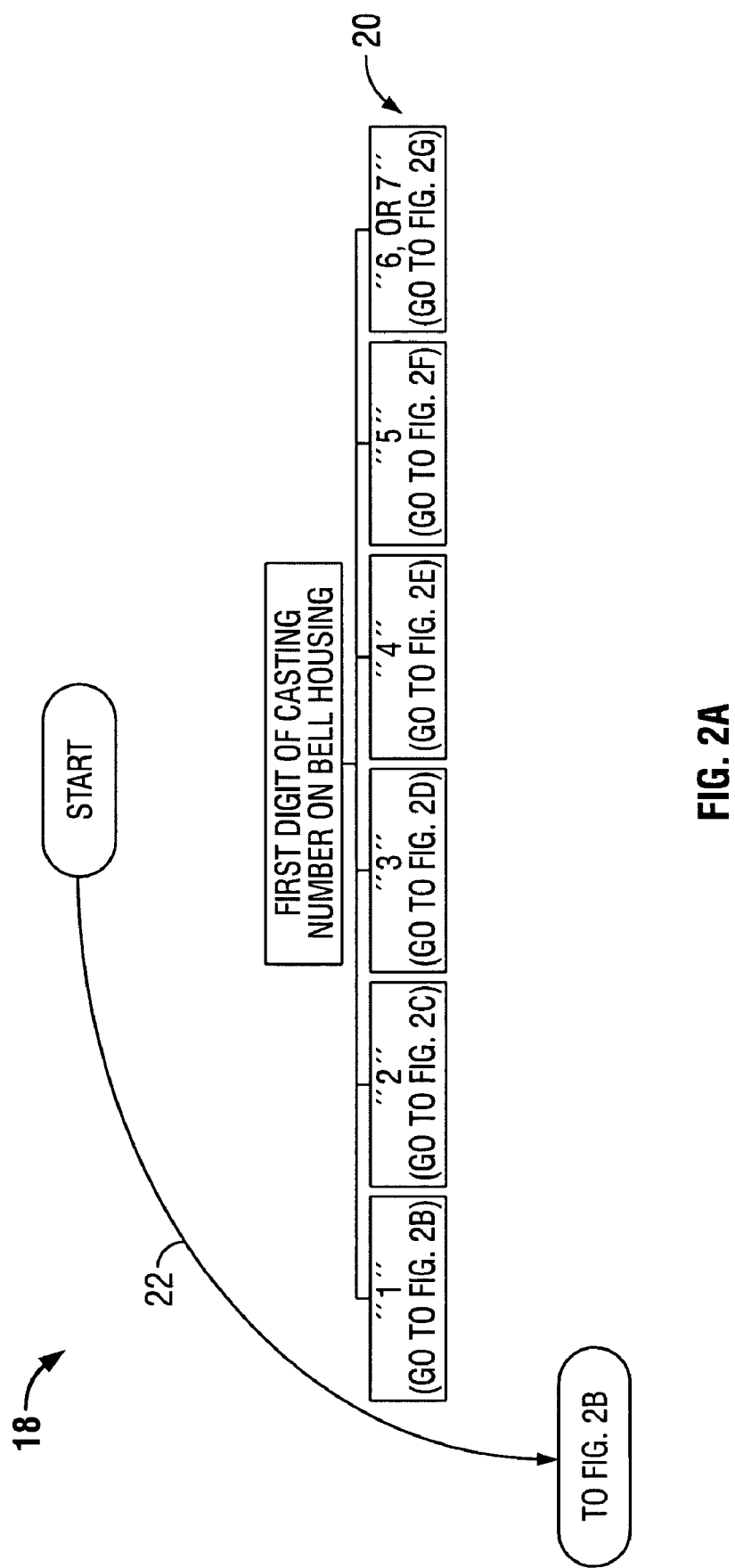

FIG. 2A depicts a first set of options of the decision tree 18. The first set of options corresponds to the first digit cast on the upper portion of the bell housing of transmissions within the category of transmissions listed in Table 1. The first set includes six options, from 1 to 6; there is no difference in the logic if the first digit is a "6" or a "7." As based upon the user's selection, which is transmitted to the system by way of user device 12, the system proceeds with the analysis of the object according to decision tree 18, as shown in FIGS. 2B-2G and described in detail below.

Figure 3B:
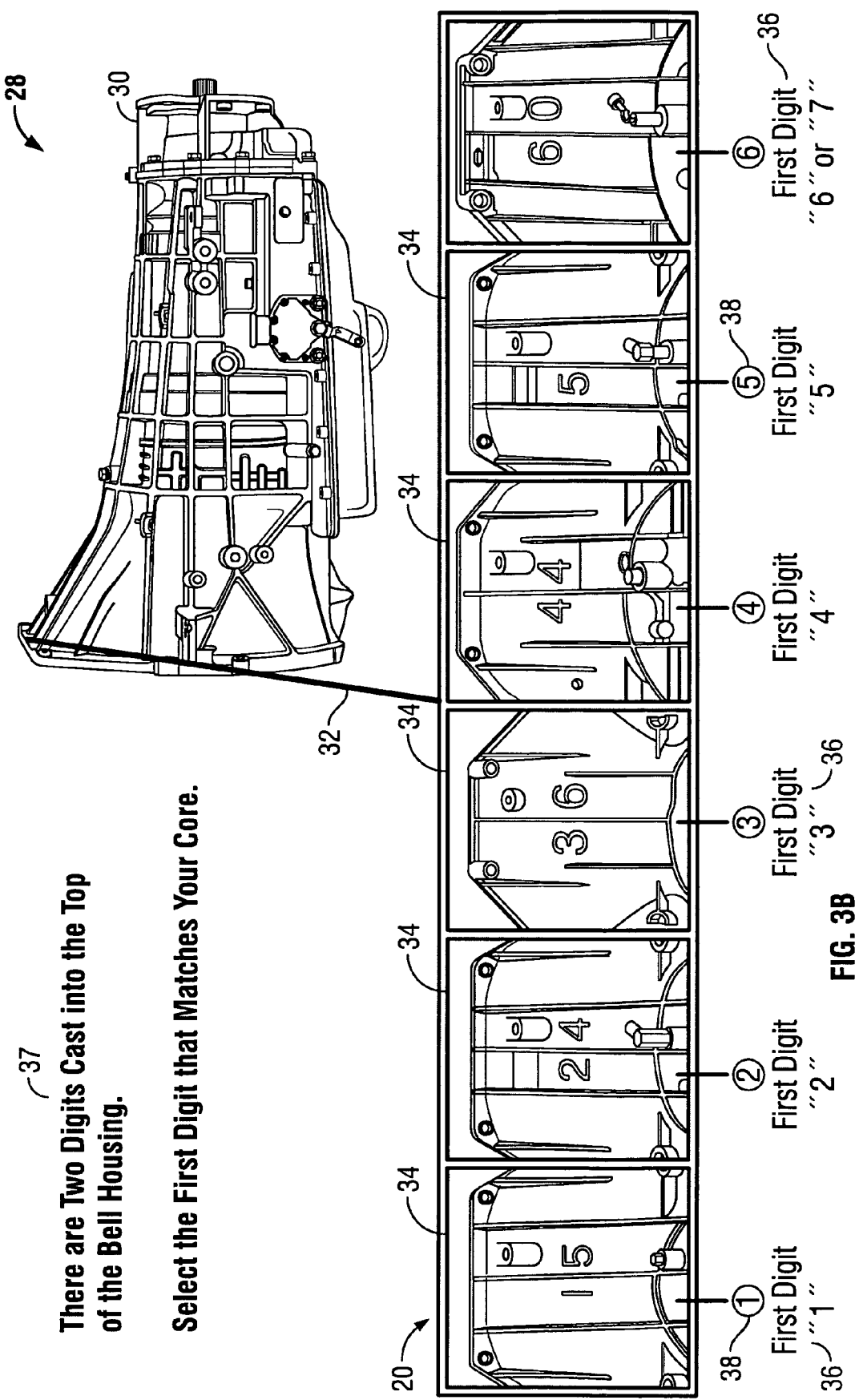
FIG. 3B is a Web page presented when a user clicks on the "click here to continue" icon of FIG. 3A. The page presented depicts a first set of options directed to digits cast number on a bell housing of a transmission.
Figure 3C:
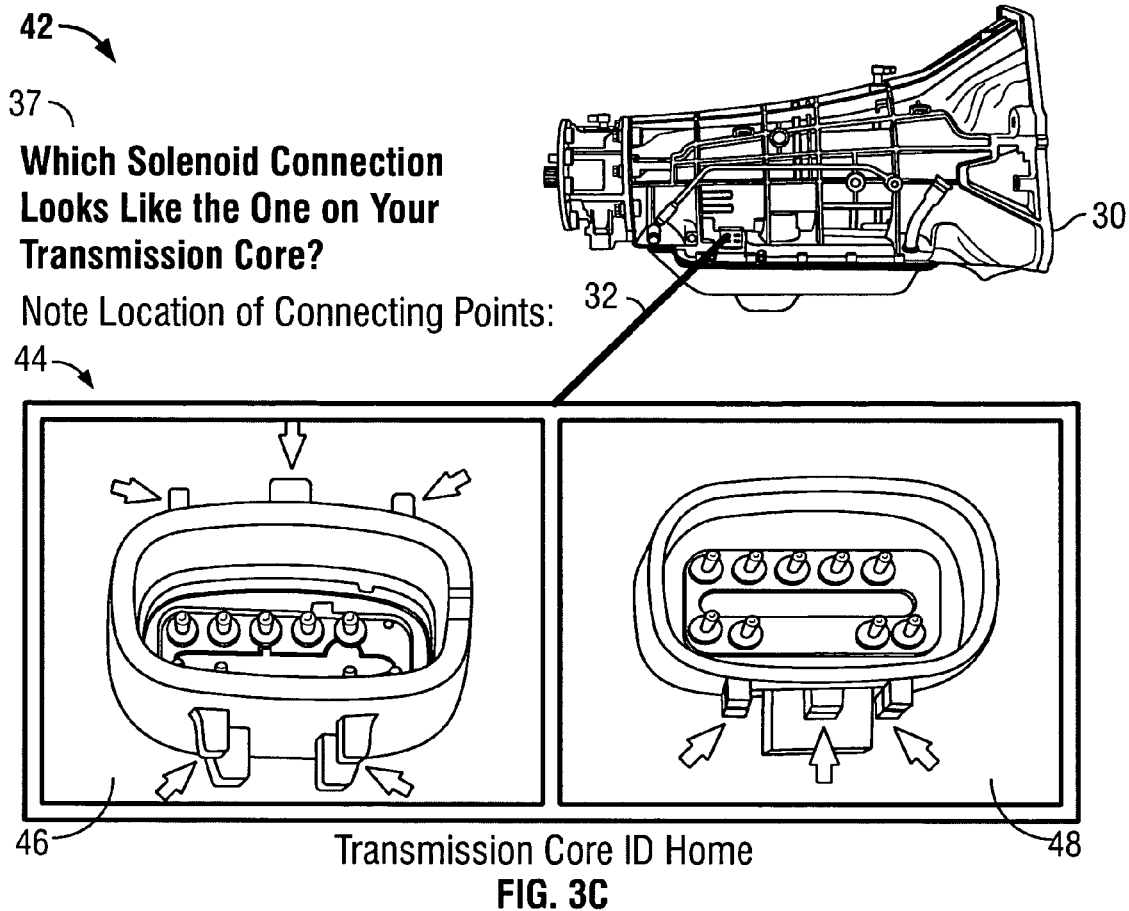
FIG. 3C is a Web page that results from selecting the "First digit '1'" option of FIG. 3B, depicting a second set of options directed to the solenoid connection.

FIGS. 3B to 4N depict Web pages presented to a user that interacts with the system 10 by using a user device 12. The Web pages are presented in manner consistent with the decision tree 18. For example, FIG. 3B is a Web page 28 depicting the set of options presented to a user at the first level of the decision tree, i.e., set 20. As previously explained, at the first level of decision tree, the user is asked to indicate the first digit in the sequence that matches a digit cast on the bell housing. Also included is side view 30 of a transmission with a reference line 32 pointing to the location on a transmission where the identifying digits are located. In addition, instructions 37 for locating information required for identification may be provided for each step in the identification process. Each option of the first set includes a visual depiction 34, text 36 and indicia 38 to assist the user in identifying the information required, namely, the leading digit cast on the bell housings. In preferred embodiments of the invention, the decision tree may be encoded as a series of hyperlinks of the Web site from which identification may be obtained.

Figures 1, 2B:
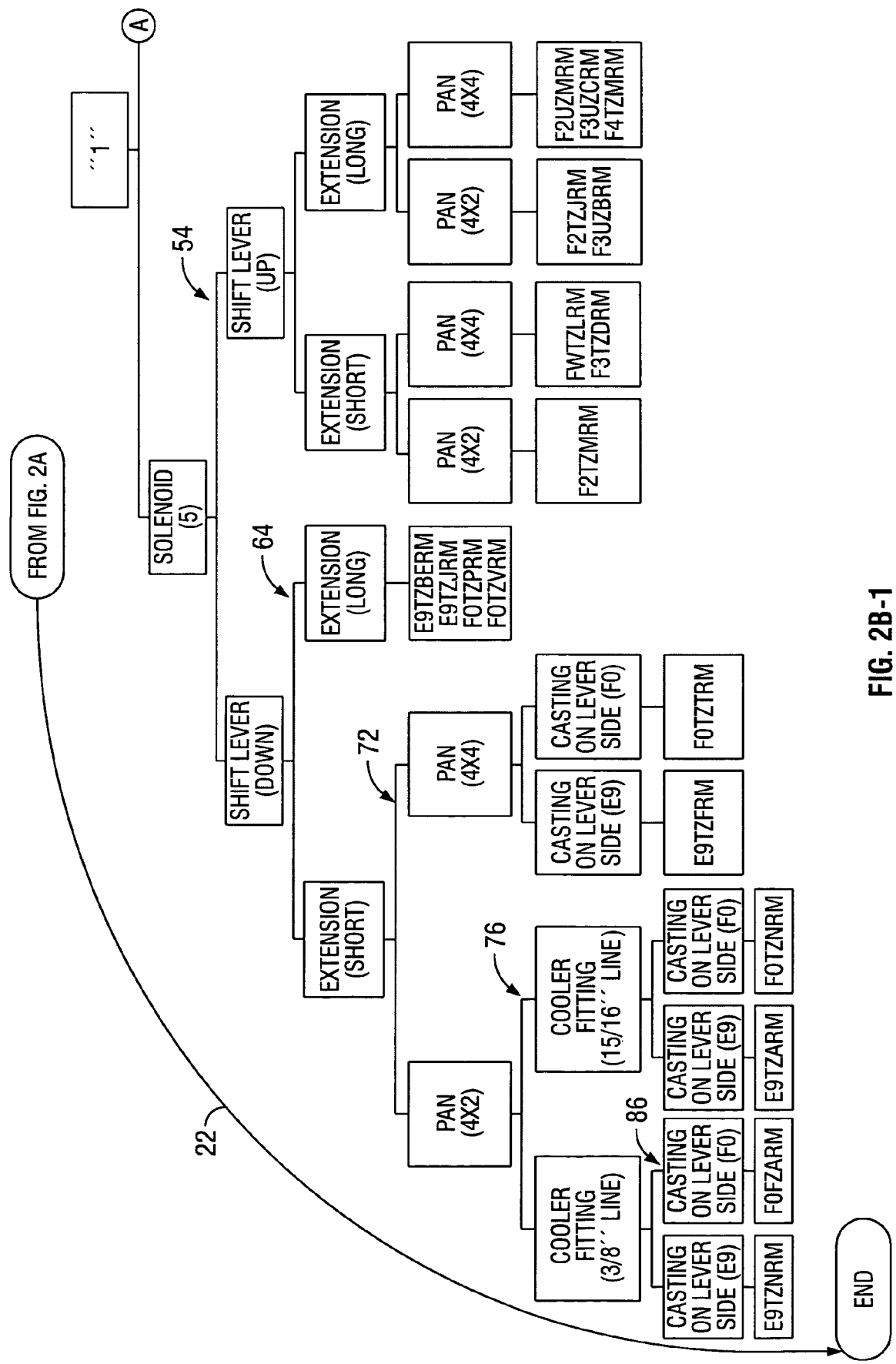

FIGS. 3A to 3H provide an illustrative example in which a system user employs the logic of the hierarchical decision tree 18 in identification of an unknown transmission. In this example, the user discovers, as directed by the system 10, that the unknown transmission has distinct features that correspond to the features of the left most branch of the decision tree, as indicated by arrow 22 (FIGS. 2A-2B). FIGS. 3A-H are arranged in the sequence in which the user encounters the Web pages in this example. First, FIG. 3A illustrates a home page 24 for the identification system. The identification process is begun by clicking the icon labeled "click here to be begin" appearing on a user device in the illustrated embodiment.

Figures 2, 2B:
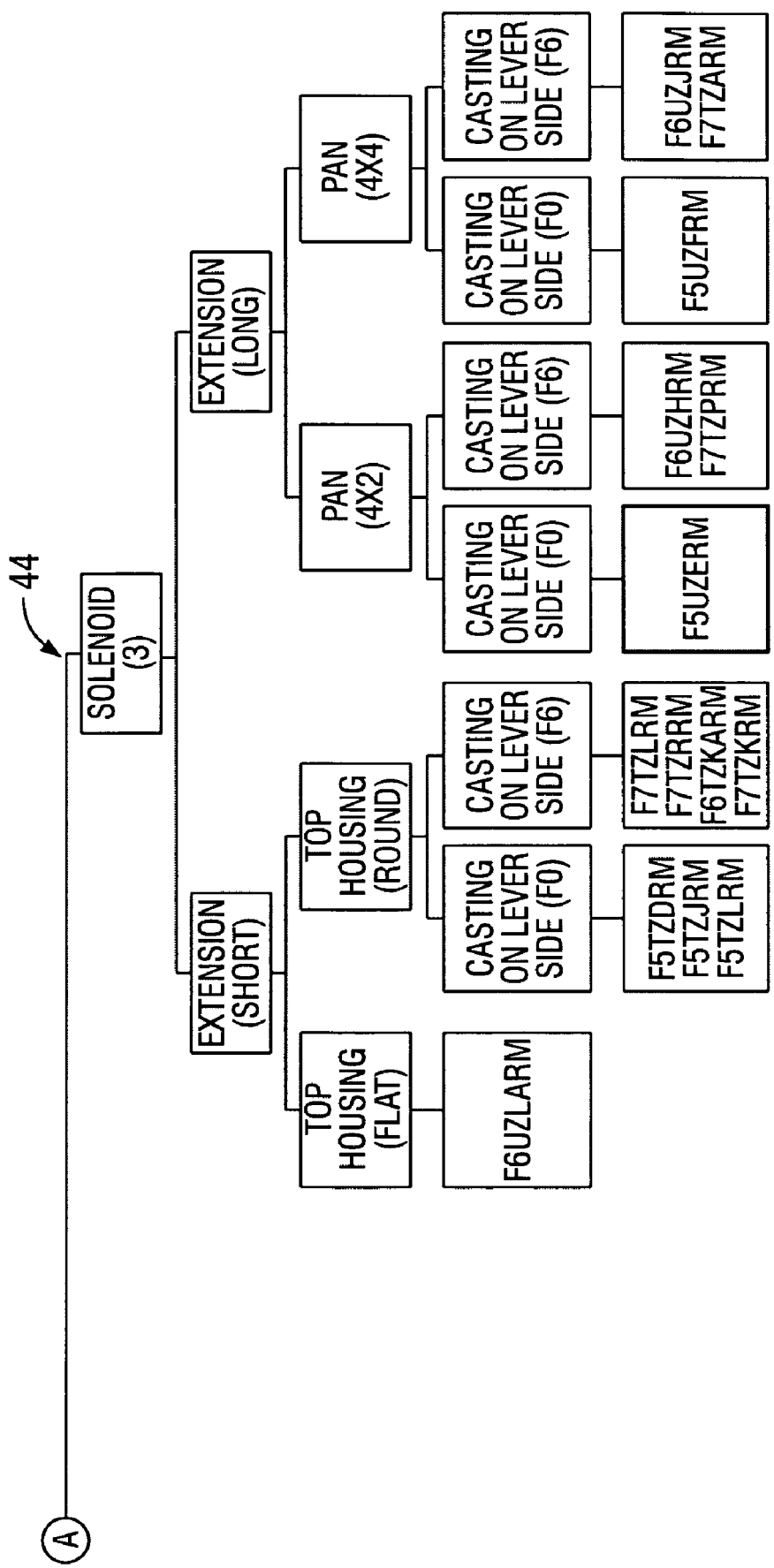
Figures 1, 2C:
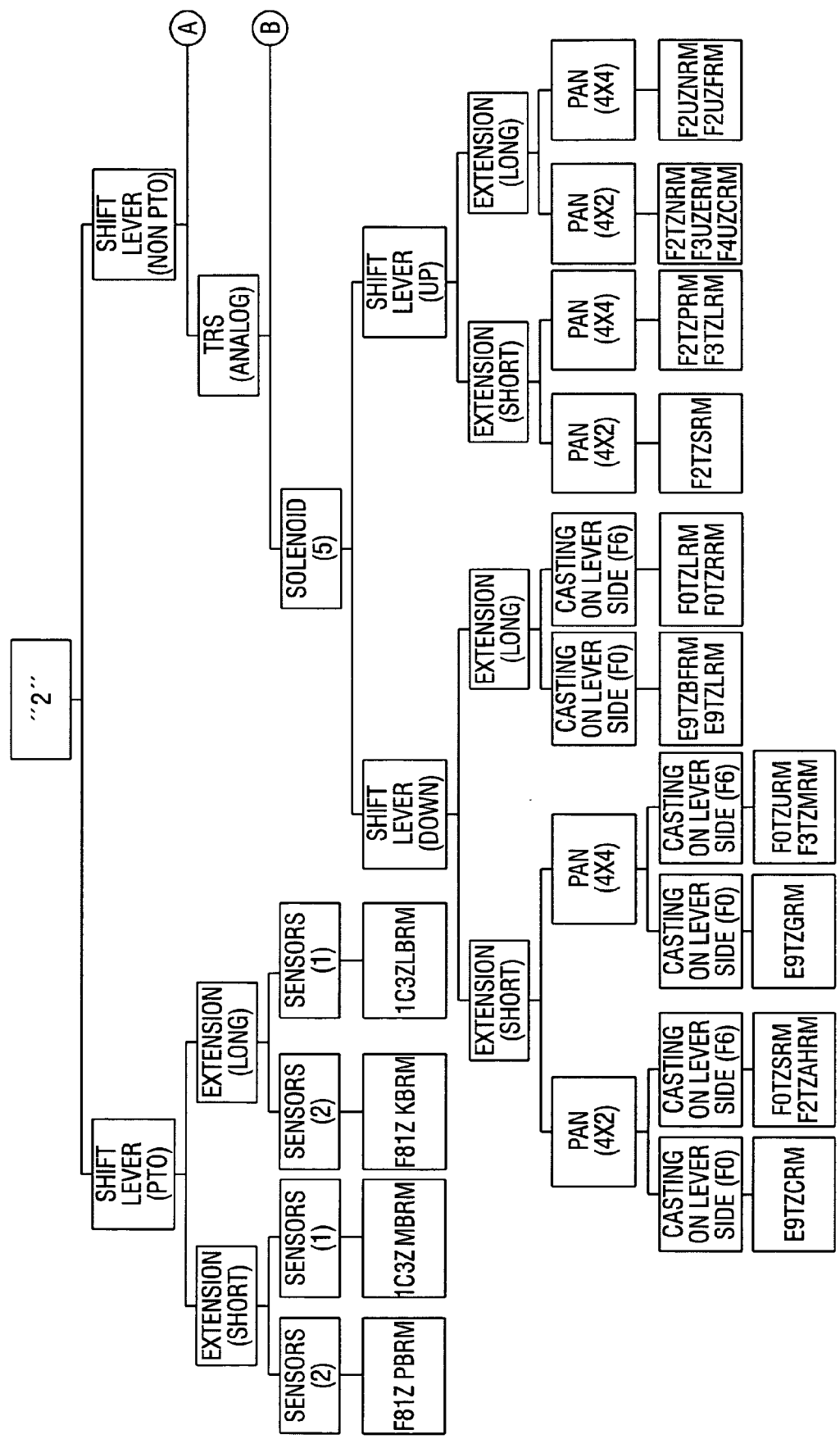
Figures 2, 2C:
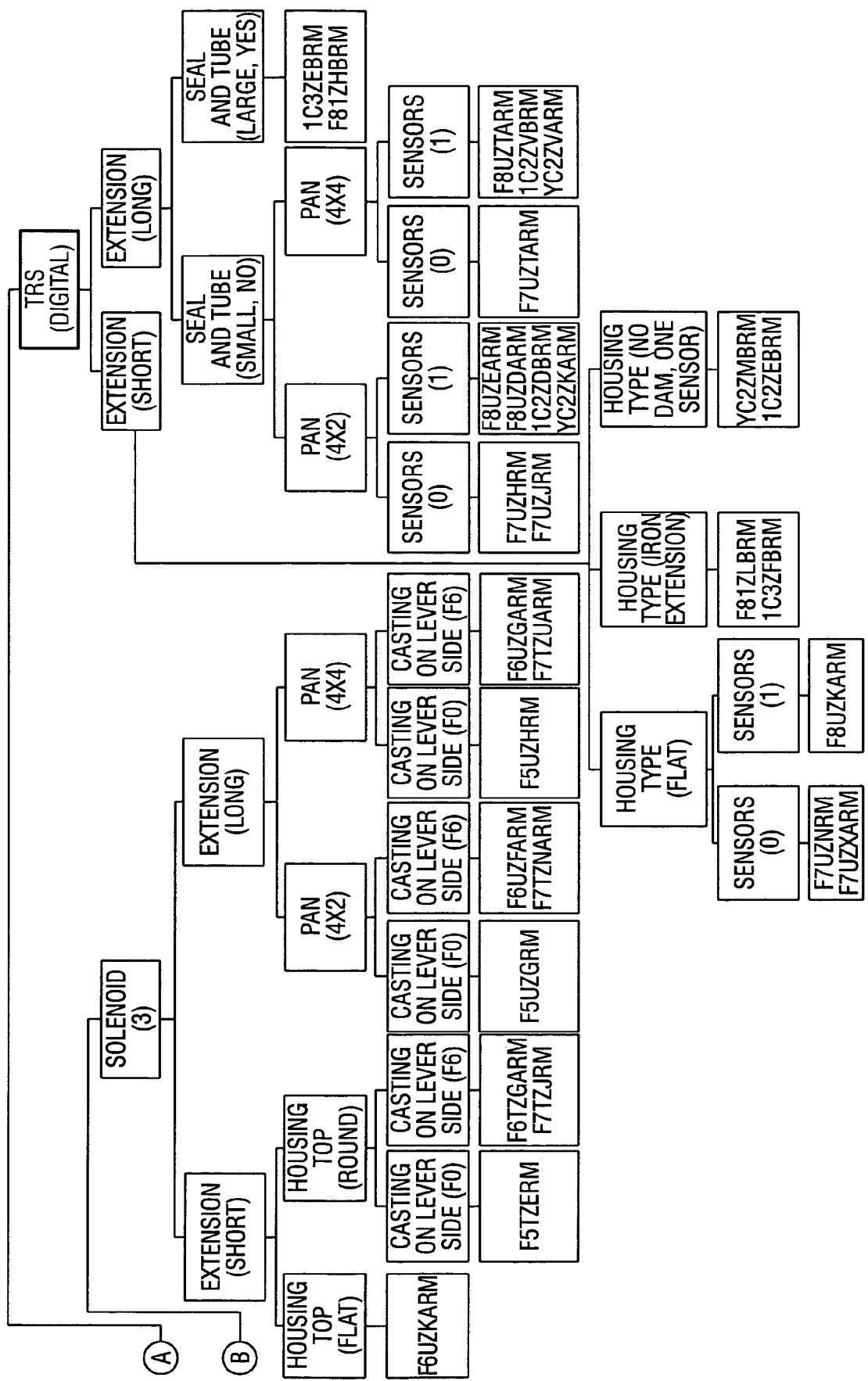
Figures 1, 2D:
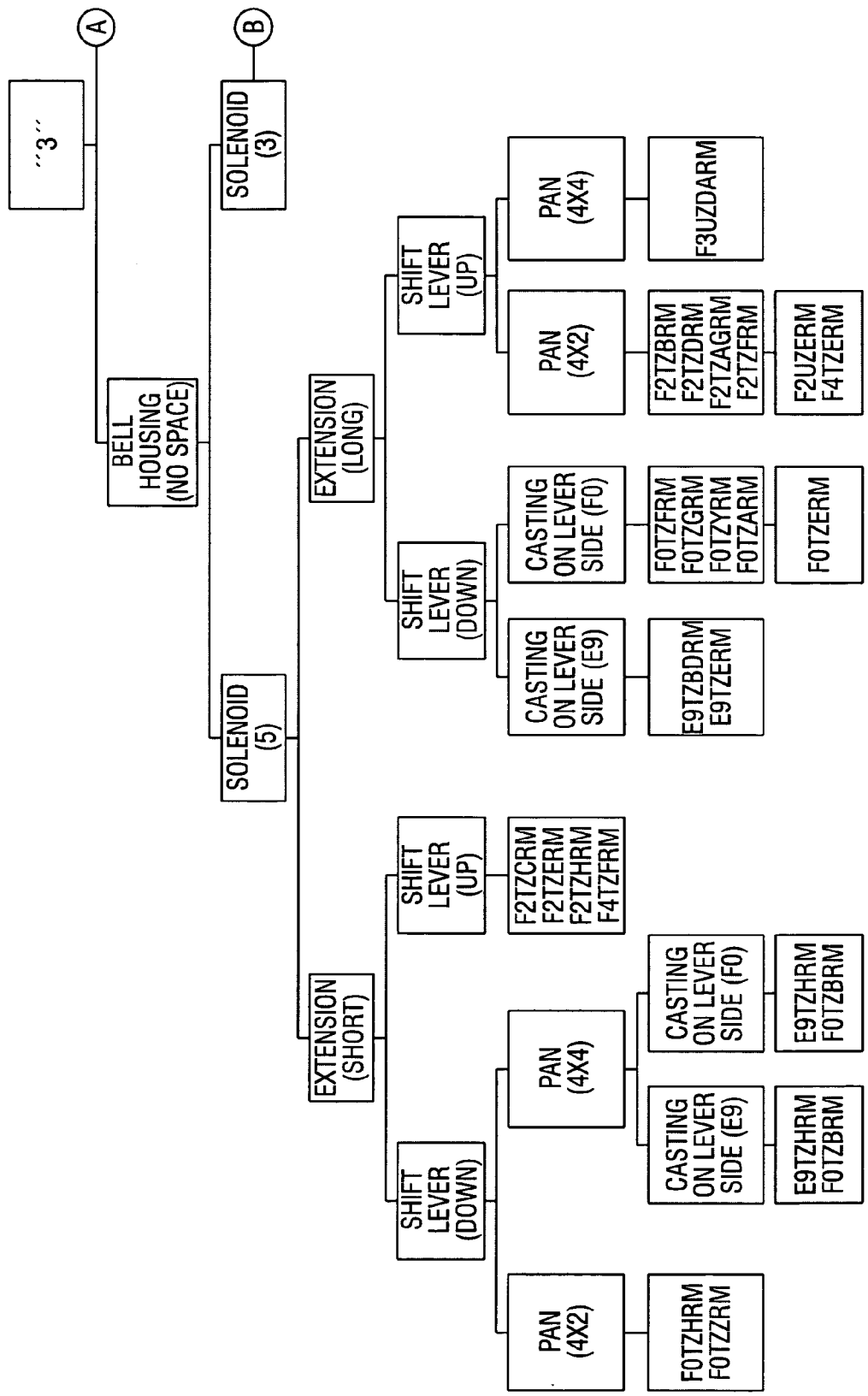
Figures 2, 2D:
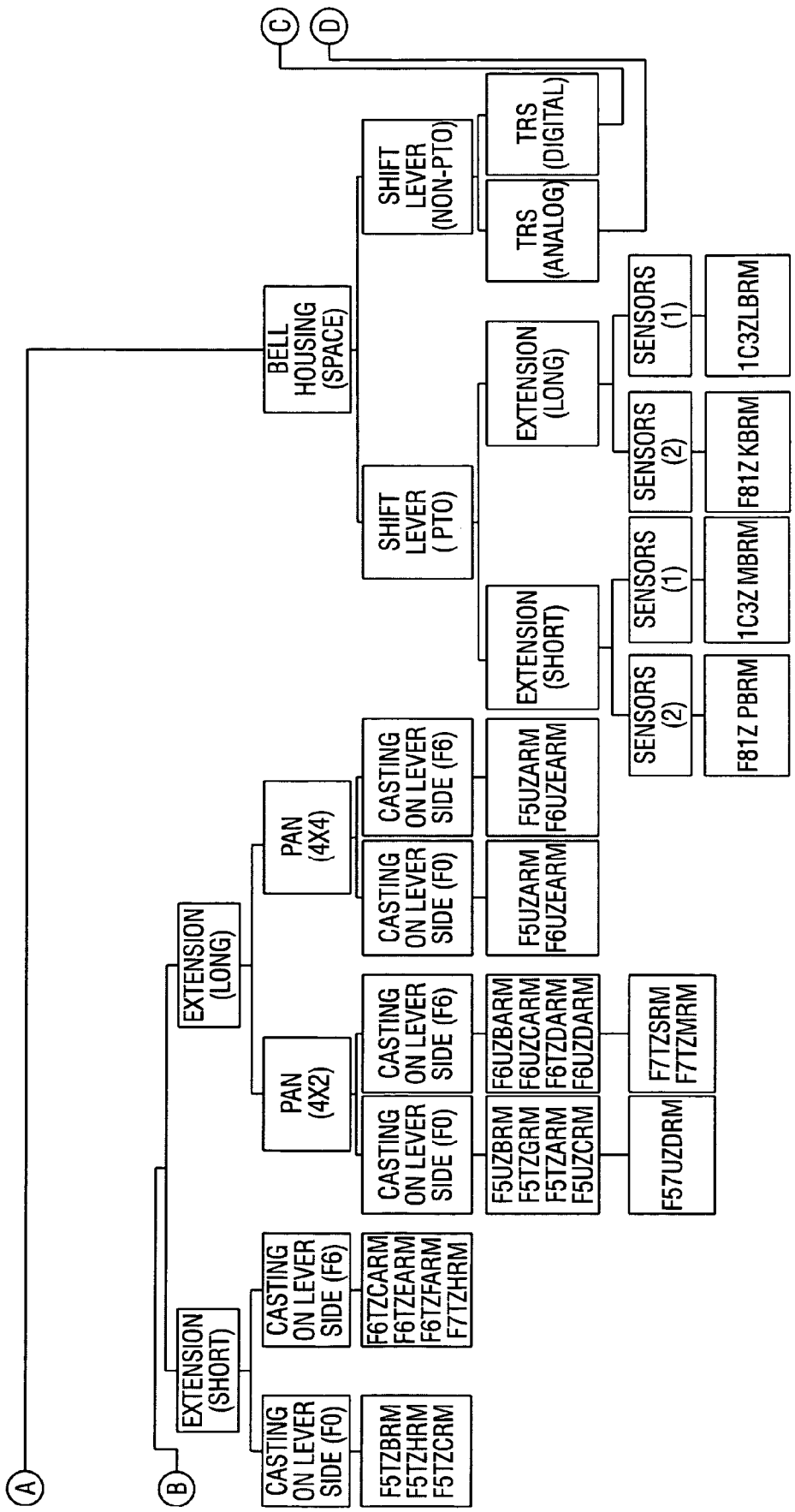
Figures 2, 2D, 3:
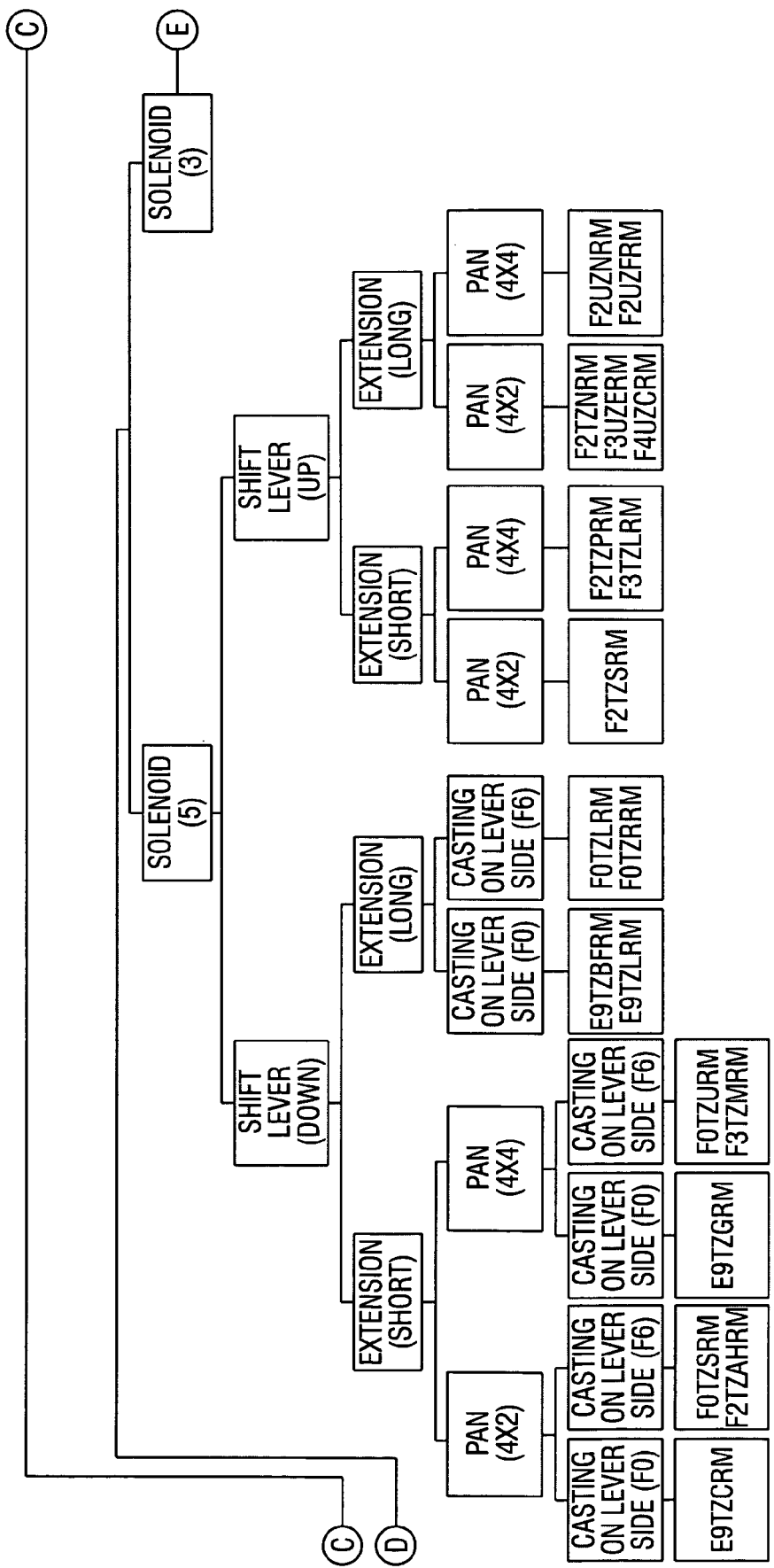
Figures 2, 2D, 3, 4:
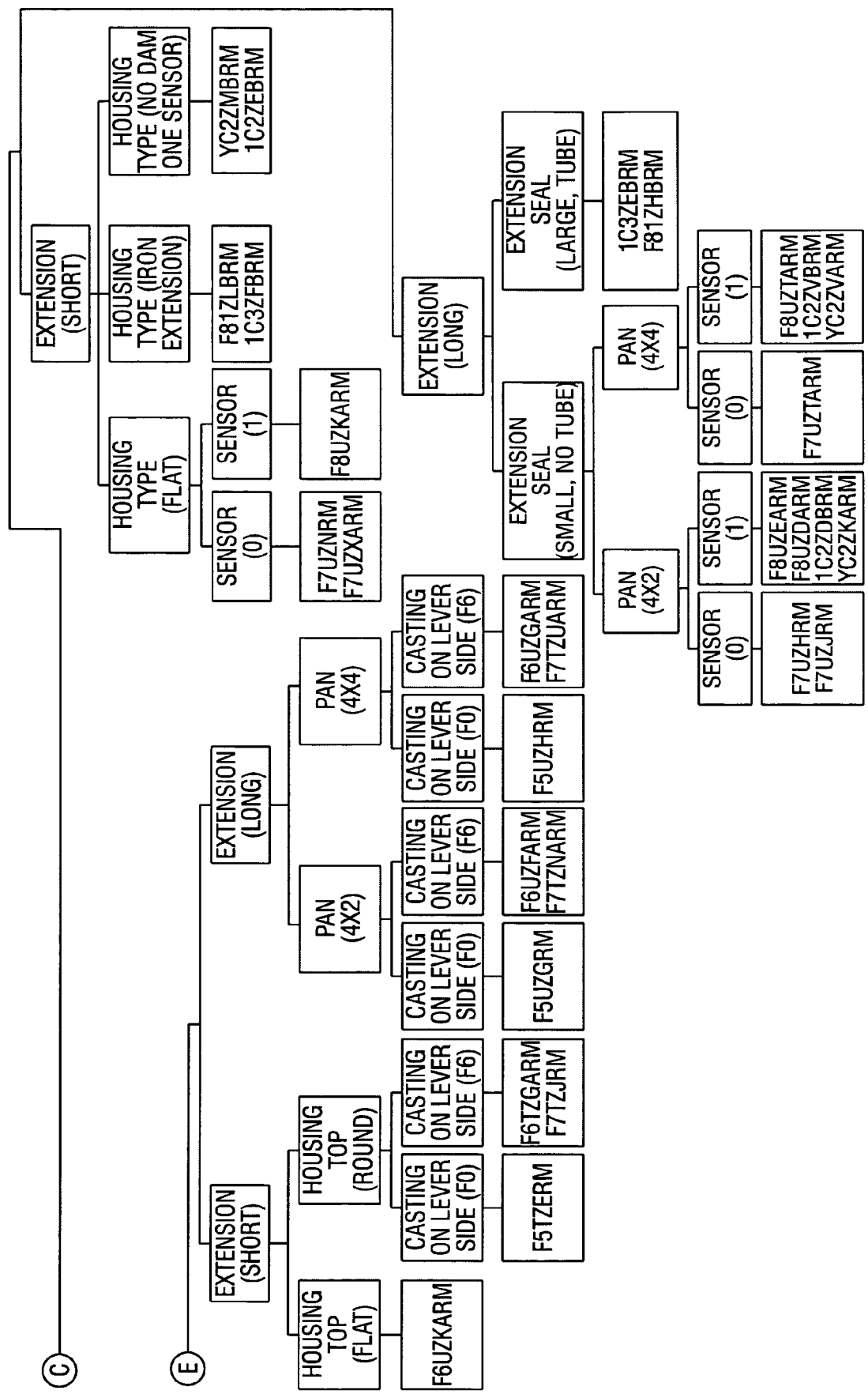
Figure 2E:
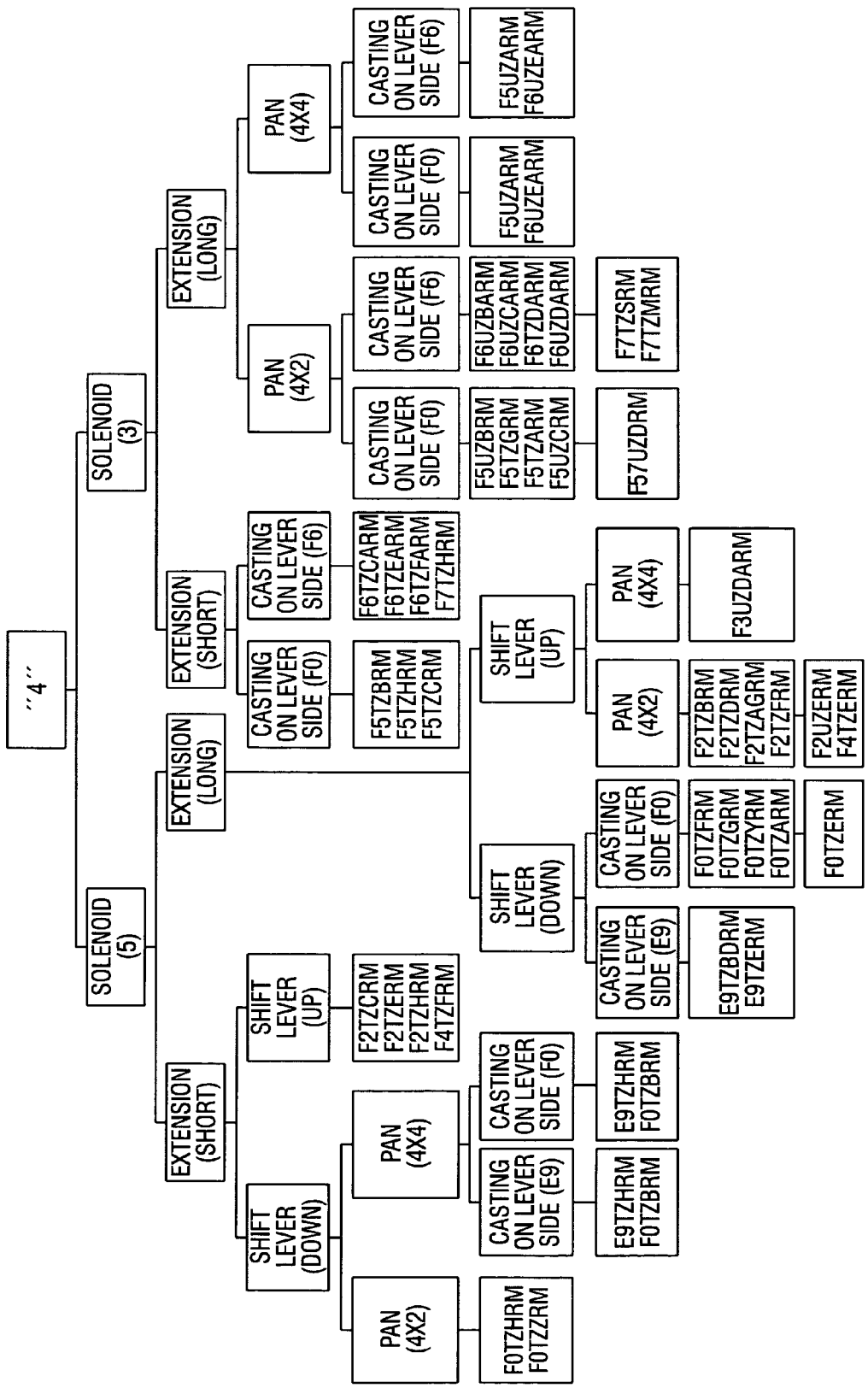
FIG. 2E is a continuation of the simplified decision tree of FIG. 2A, depicting sets of options following selection of the fourth option of the first set.
Figures 1, 2F:
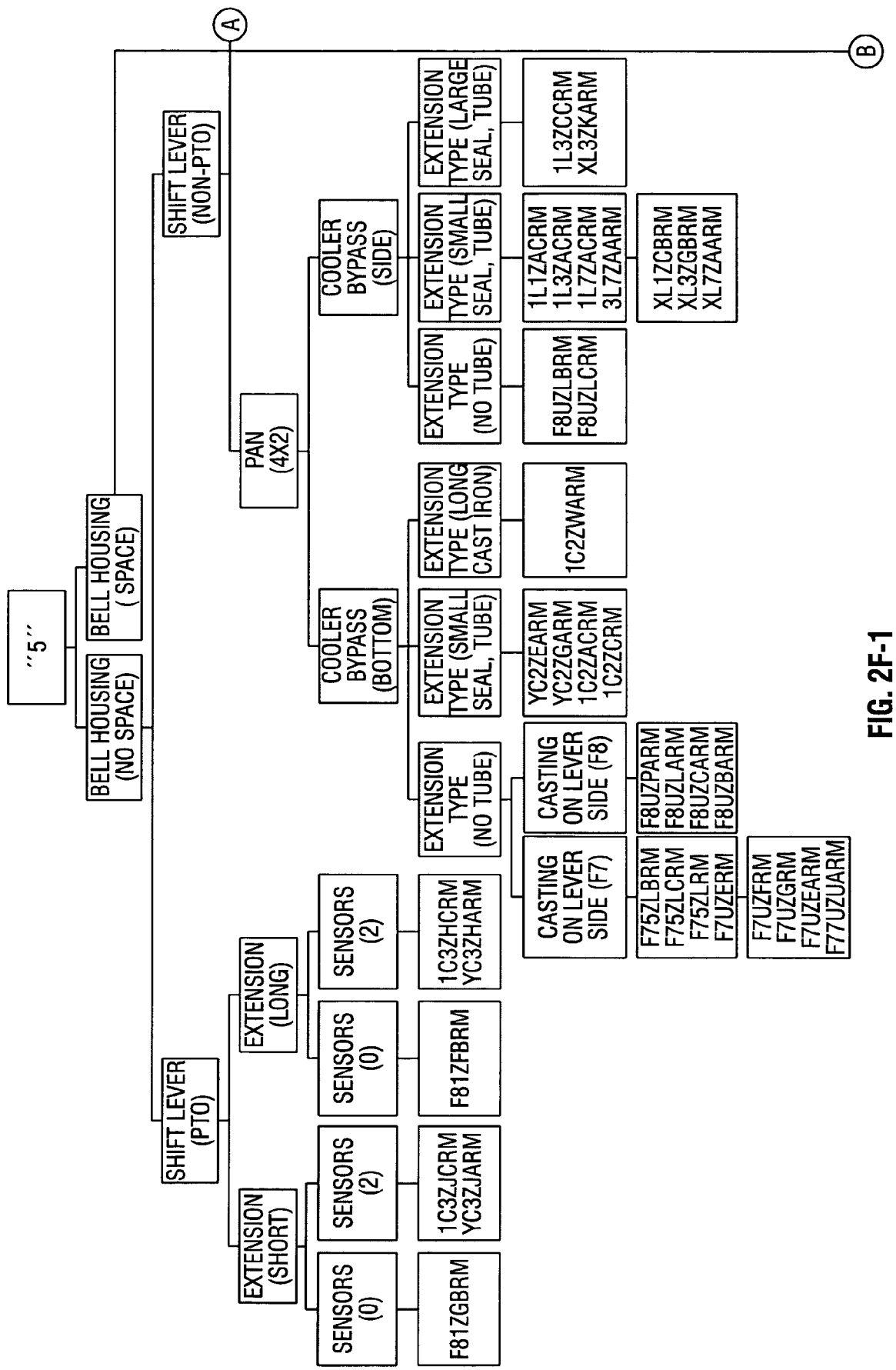
Figures 2, 2F:
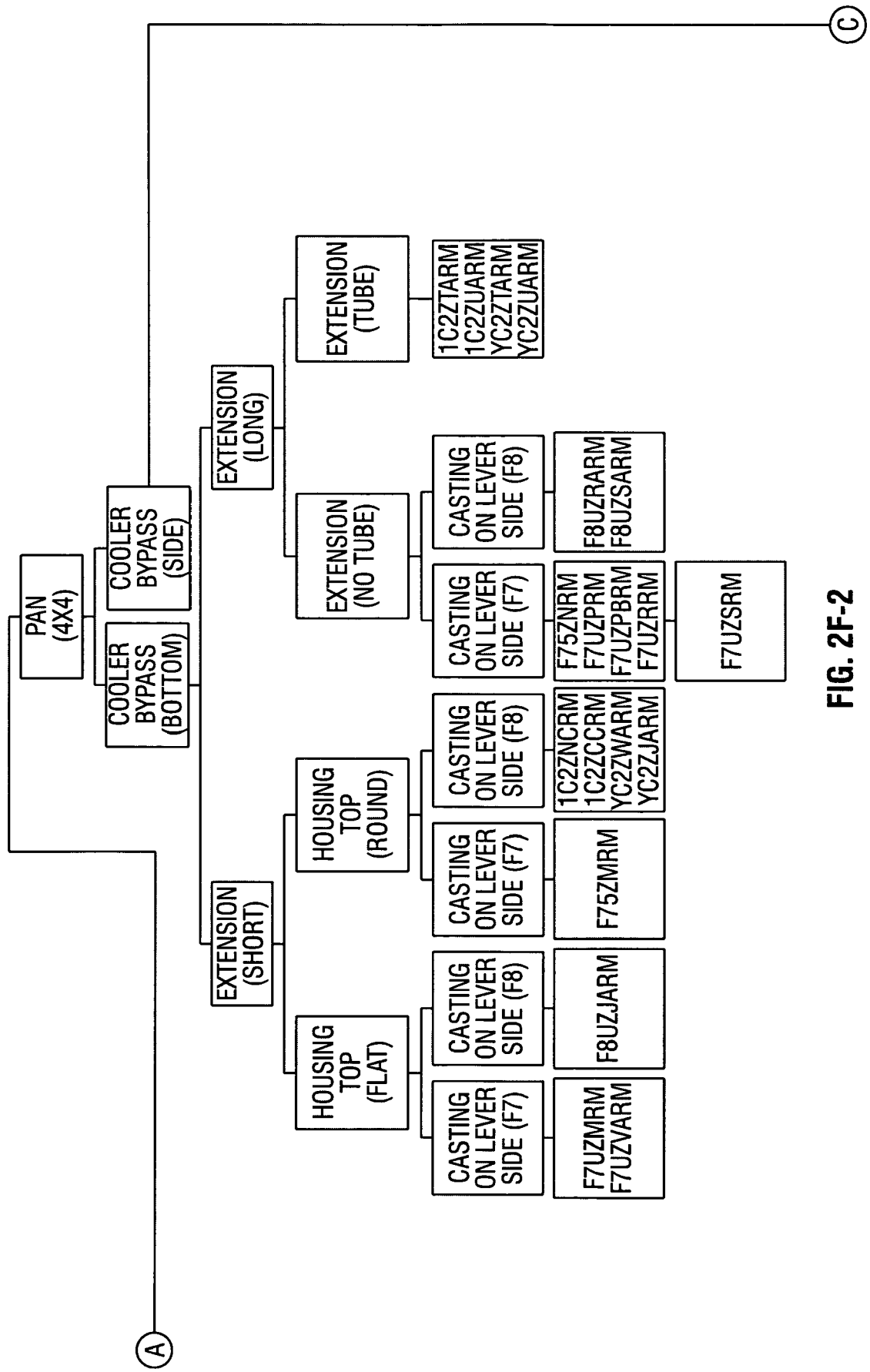
Figures 2, 2F, 3:
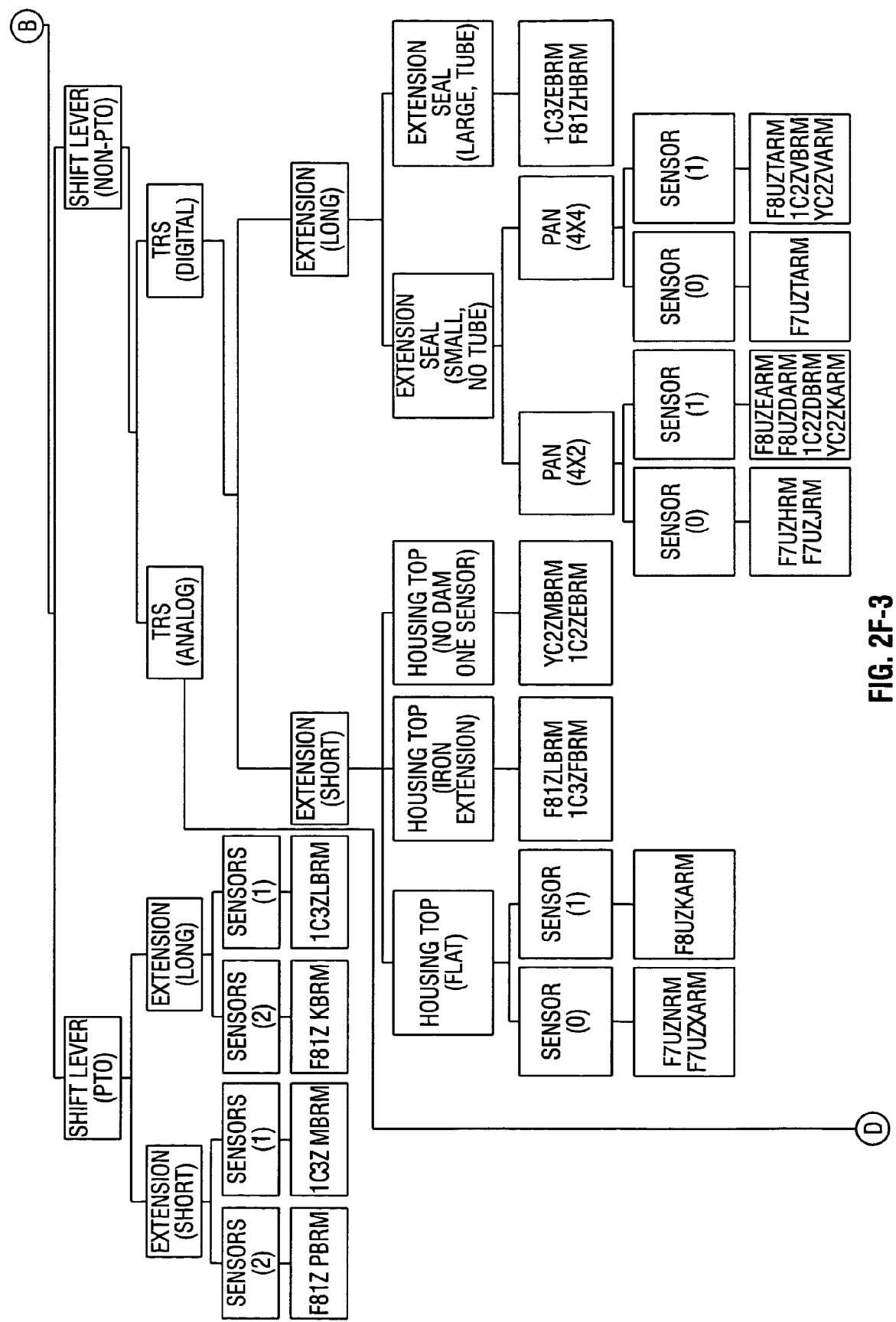
Figures 2, 2F, 3, 4:
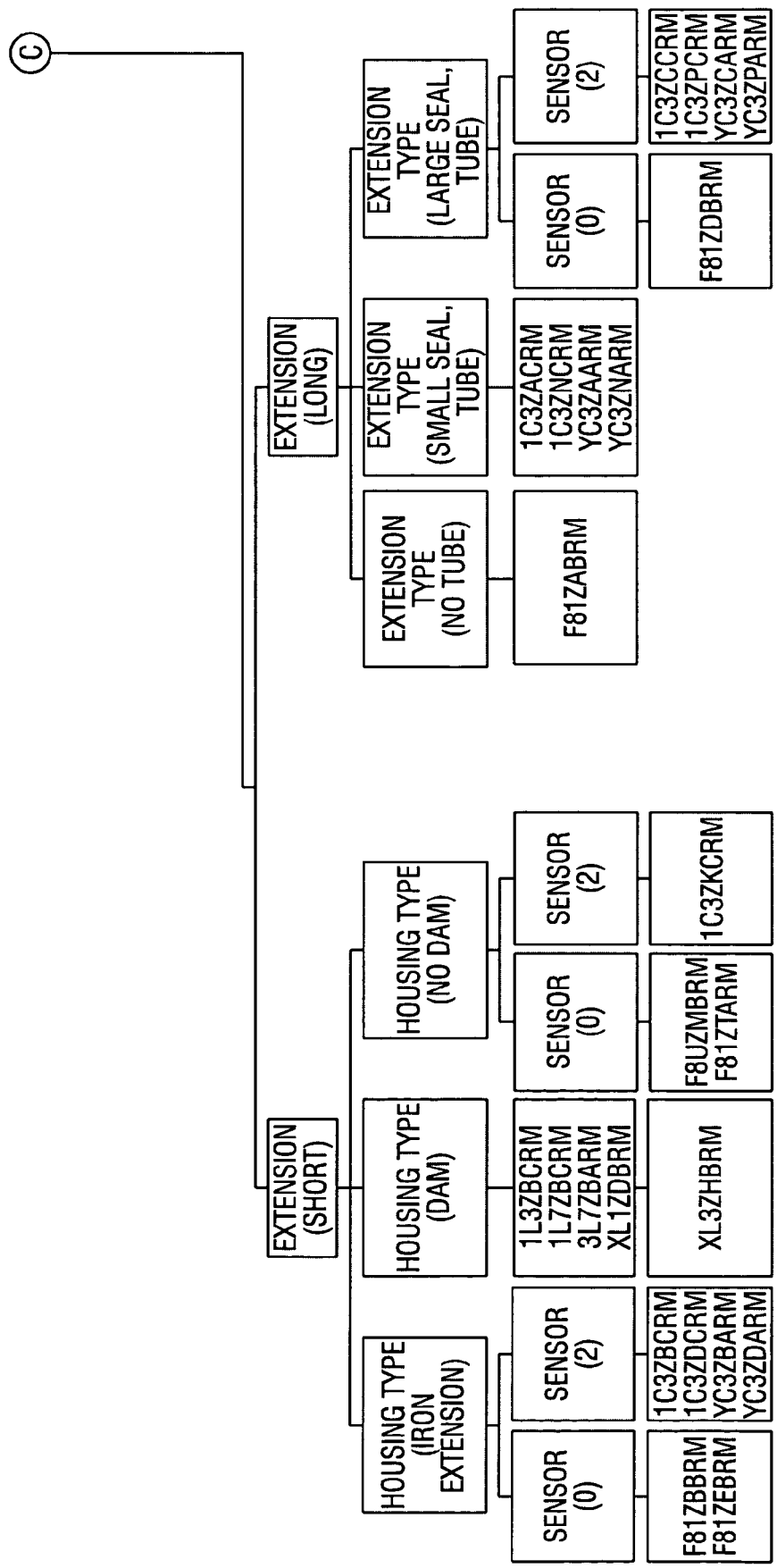

The system 10 then presents the Web page 28 (FIG. 3B) depicting the first set 20 of options. The first set of options is directed to identifying the first of two digits stamped into the bell housing of the transmission. The Web page also depicts the transmission icon 30 and the reference line 32, identifying the location of the digits on the transmission where the digits will be found. Reference line 32 points to an upper portion of the transmission icon, and the set of options consisting of the digits from 1 to 5, and 6 and 7 together—as they are equivalent for this purpose. Each option depicts a close-up view 34 of a number cast into a bell housing of a transmission satisfying the respective option and further includes an indicia 38 emphasizing the first of the two digits. The unknown transmission of the present example has a "1" cast as the first digit on the bell housing. Upon selection by the user of the first option (i.e., option representing a "1" cast on the bell housing), the system will present a second set 44 of options in diagrammatic form in FIGS. 2B-1 and 2B-2, directed to the solenoid connection type, and display a Web page 42 (FIG. 3C) for selecting a corresponding solenoid connection type.

Solenoid-connection Web page 42 presents a set of options to the user directed to distinguishing between two different configurations for solenoid connections used by the manufacturer on transmissions of the E40D and 4R100 models. The location of the parts on the transmission assembly is indicated by reference line 32 and transmission icon 30. The respective parts are labeled "46" and "48" and correspond to a five pin and three pin solenoid. The connecting points are identified by arrows that appear on the Web pages. For the present example, the two options are reflected in decision tree 18 at level 44 as "solenoid (5)," and "solenoid (3)" in FIGS. 2B-1 and 2B-2.

Figure 3D:
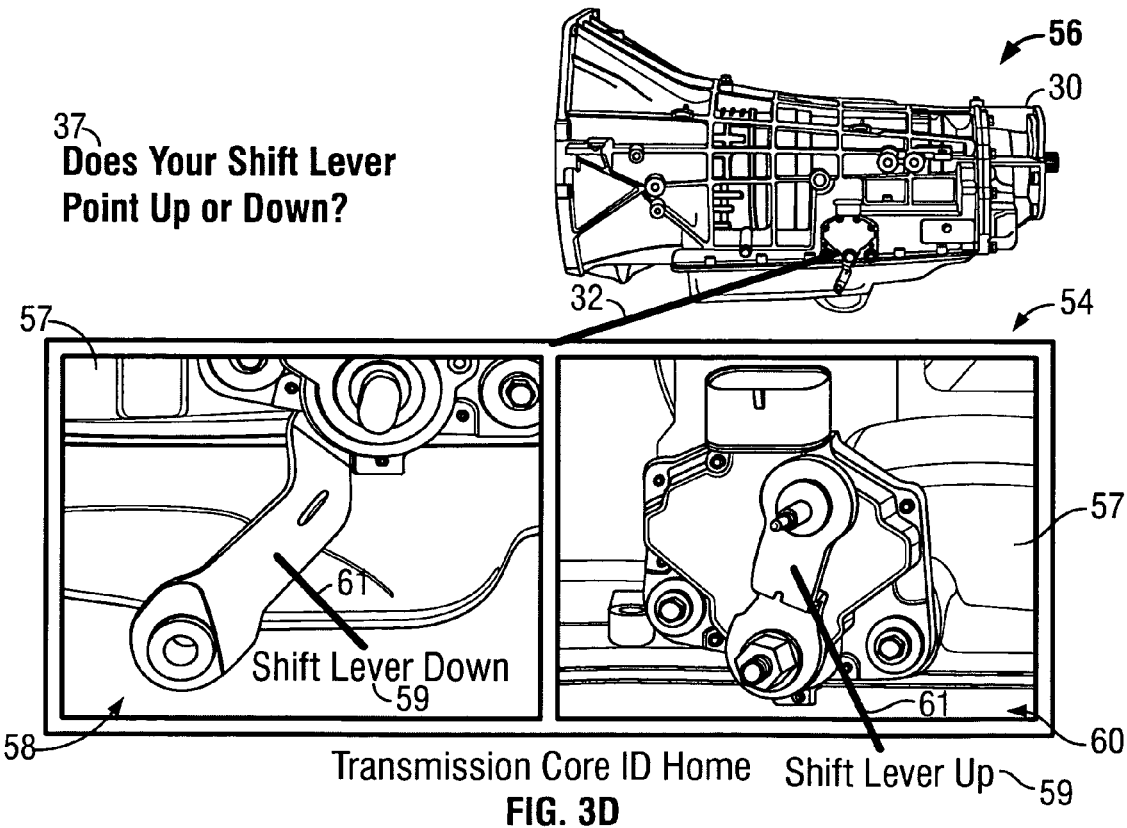
FIG. 3D is a Web page that results from selecting the "five prong solenoid connection" option of FIG. 3C, depicting a third set of options directed to the shift lever orientation.

According to the present example, a third set 54 of options directed to the orientation of the transmission shift lever is presented as depicted in Web page 56 (FIG. 3D). The shift lever is oriented either up or down, corresponding to options 60 and 58 in FIG. 3D. Each option for the orientation of the shift lever includes a close-up depiction 57, text 59 and indicia 61. Again, the transmission icon 30 is shown in the upper right hand portion of Web page 56, and the reference line 32 points to a lower, center portion of the transmission icon. In this instance, the user selects option 58, representing a transmission having a shift lever oriented downward. Thus, following the logic of decision tree 18 (see FIGS. 2B-1 and 2B-2) the system will next present set 64.

Figure 3E:
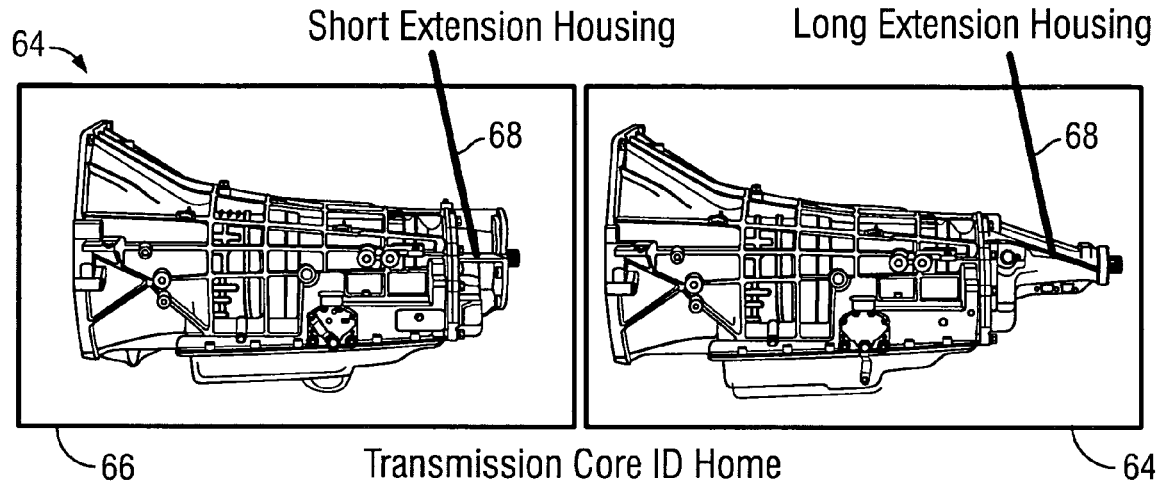
FIG. 3E is a Web page which results from selecting the "shift lever down" option of FIG. 3D, depicting a fourth set of options directed to housing extension size.

Set 64 directs the user to determine whether the extension housing is short or long, as present to the user in Web page 62 (FIG. 3E). The housing-extension Web page 62 depicts a set of the two options offered. As shown in FIG. 3E, transmission icons having either long 64 or short 66 extensions are presented to the user. Both options include a reference line 68 directed to the rear portion of the transmission. These options are represented in the decision tree as boxes labeled "housing extension (long)" and "housing extension (short)." If the unknown transmission core has a long extension, at step 64, then the unknown transmission can be identified as an E4OD 7.5 4×2 transmission used for model years 1989-1991 within the following part-number listing: E9TZBERM, E9TZJRM, F0TZPRM and F0TZVRM. At this point, the object has been identified and the system will display an identification page for the unknown transmission. For this object, more than one part number corresponds to the same physical object.

Figure 3F:
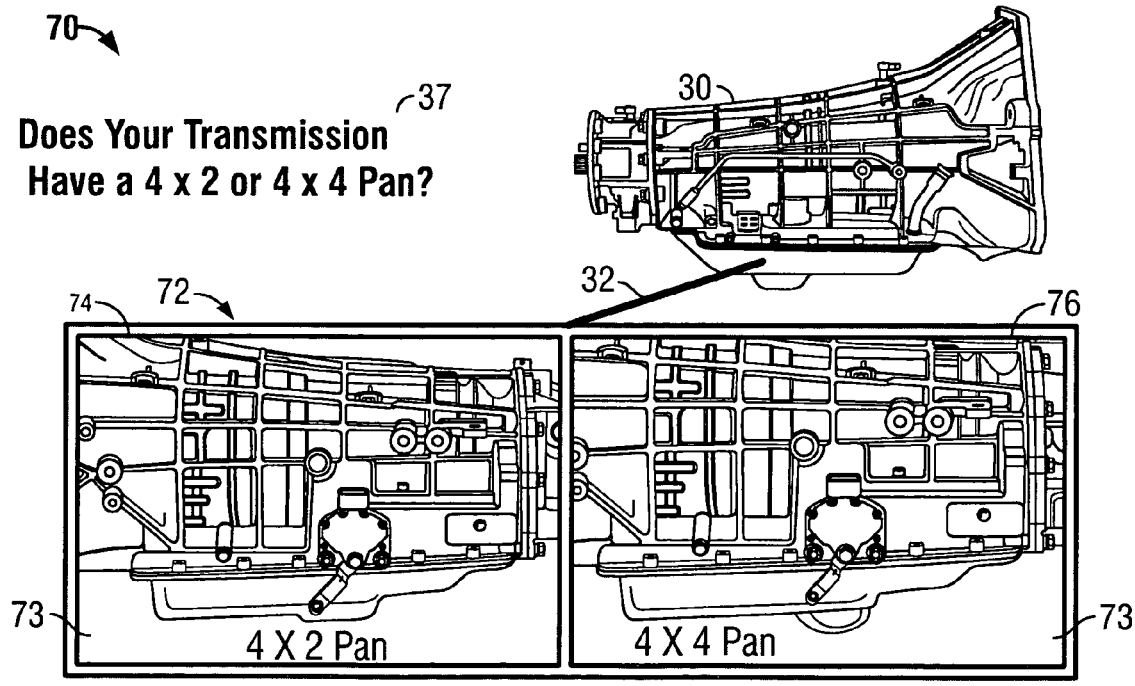
FIG. 3F is a Web page that results from selecting the "short extension housing" option of FIG. 3E, depicting a fifth set of options directed to pan type.

In the present example, as referenced by arrow 22, the transmission has a short extension housing. Thus, the system 10 request will further information to identify the unknown transmission. According to the decision tree 18 at set 72, the system will ask the user whether the transmission has an oil pan for two-wheel-drive transmissions, as shown in option 74 (FIG. 3F), or an oil pan designed for four-wheel-drive transmissions, as shown in option 76 (FIG. 3F). Options 74, 76 include visual depictions 73 and text 75 to aid in distinguishing the respective configurations of the oil pan feature. The pan-type Web page includes reference line 32 pointing to a lower portion of the transmission icon 30 for locating the pan. Close-up views of the two different pan types are presented in side-by-side comparison to the user.

Figure 3G:
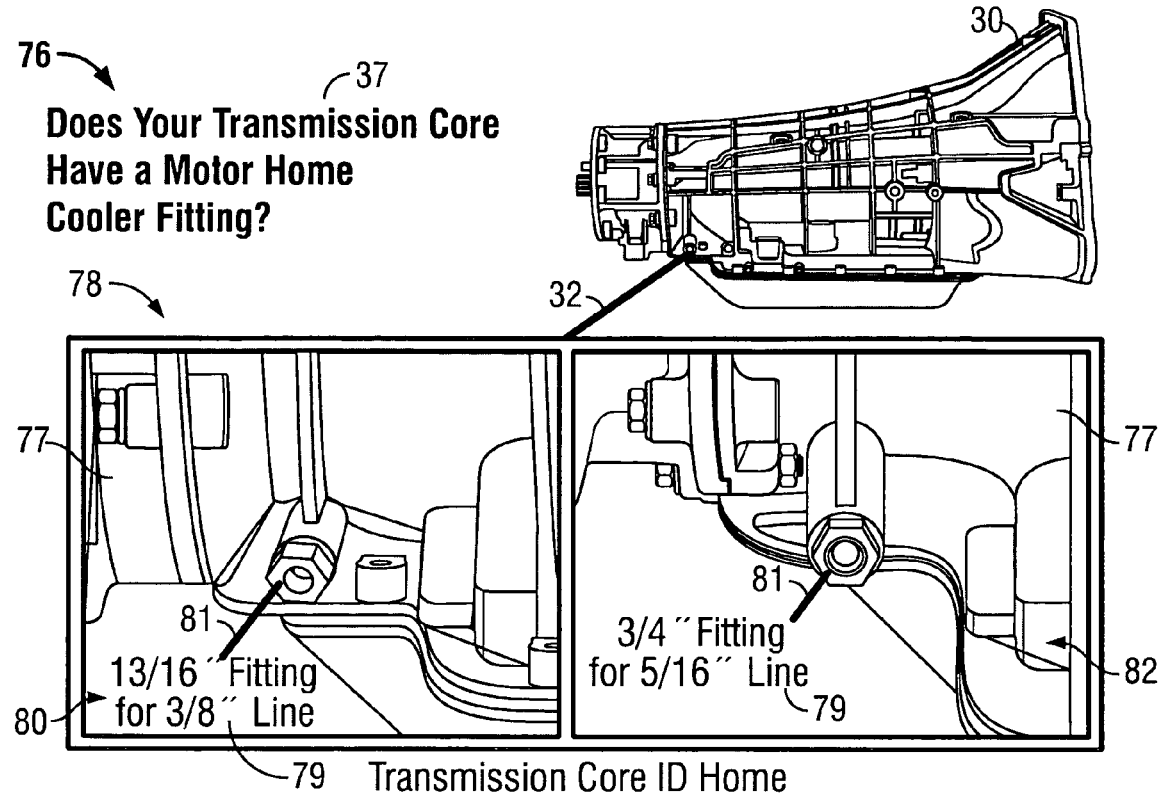
FIG. 3G is a Web page that results from selecting the "4×2 Pan" option of FIG. 3F, depicting a sixth set of options directed to cooler fitting size.
Figure 3H:
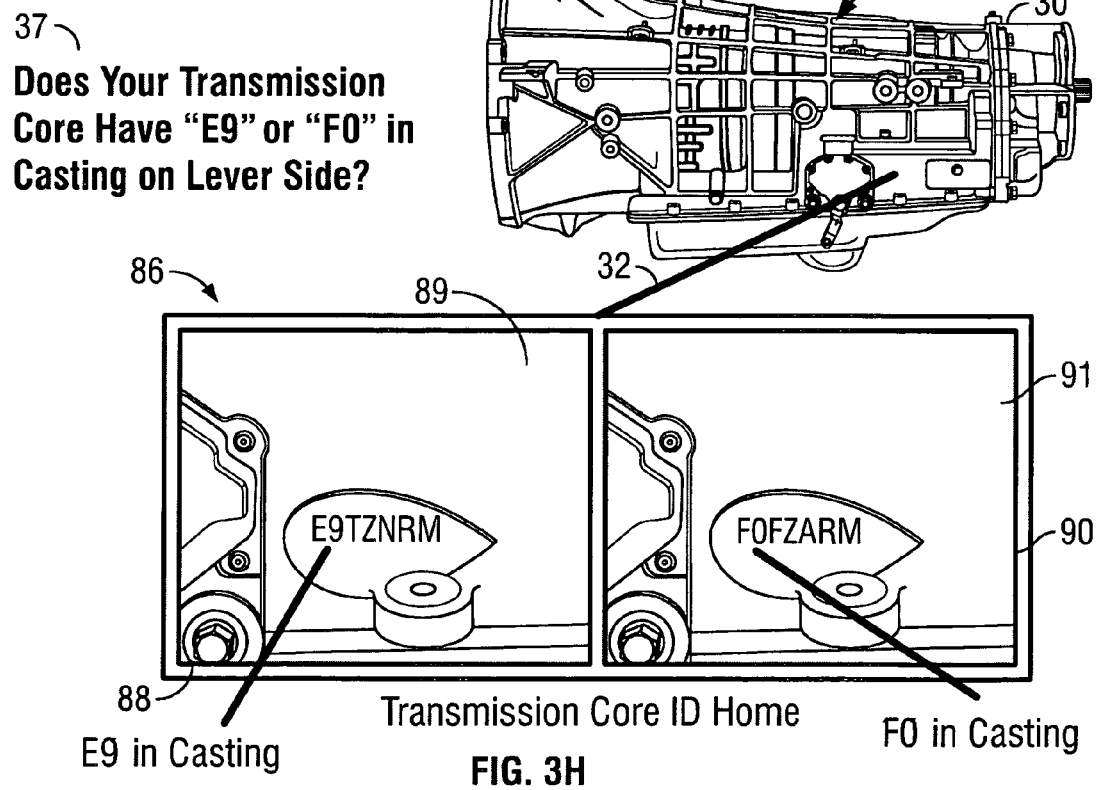
FIG. 3H is a Web page that results from selecting the "⅜" line" option of FIG. 3G, depicting a seventh set of options directed to a casting on lever side of the transmission.

As indicated by the decision tree 18, the next query is directed to the cooler fitting of such transmission types, i.e., set 76. FIG. 3G shows a Web page 76 that presents a sixth set of options directed to the size of fittings for transmission coolers used when towing motor homes. A first option 80 references a cooler fitting having a $13/16"$ fitting for a $3/8"$ line, while a second option 82 references a cooler fitting having a $3/4"$ fitting for a $5/16"$ line. Both options 80, 82 include visual depictions 77, text 79 and indicia 81 to aid in distinguishing the respective configurations of this feature. The cooler-fitting Web page includes a transmission icon 30 and reference line 32 identifying where on the transmission to find the cooler fitting.

Following selection of the first option 80 for the cooler fitting, Web page 84 (FIG. 3F) is presented to the user. The user is directed to locate a lever on the transmission. Reference line 32 is provided to assist the user in locating the lever. The user is then asked to determine whether the character sequence cast into the transmission on the lever side include the sequence "E9" or "F0." As shown in decision tree 18 for transmissions with cooler fittings designed for a ⅜" line, if the casting that includes the letters "E9" on the lever side of the transmission, the transmission is identified as part number E9TZNRM. If the character sequence "F0" appears on the lever side, the transmission is identified as part number F0FZARM. For transmissions with cooler fittings for a ¹⁵⁄₁₆" line, and a casting that includes the letters E9 on lever side, the object is identified as part number E9TZARM, while if the casting includes the sequence "F0" the transmission is part number F0TZNRM. It should be readily apparent from the preceding example that identification can be accomplished quickly and accurately and without need of significant experience working with or identifying transmissions.

Figure 4B:
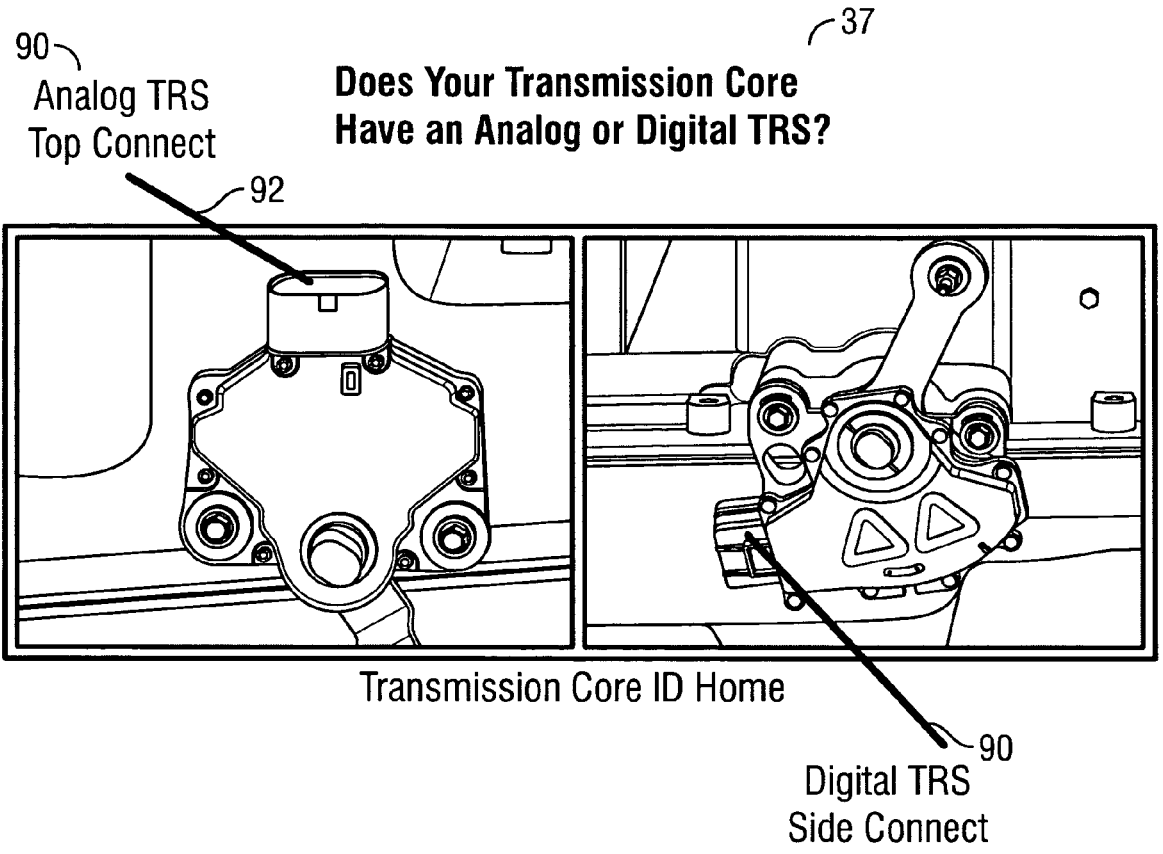
FIG. 4B is a Web page that corresponds to sets of options represented by boxes "TRS (analog)" and "TRS (digital)" of the classification scheme of FIGS. 2A-2G.
Figure 4C:
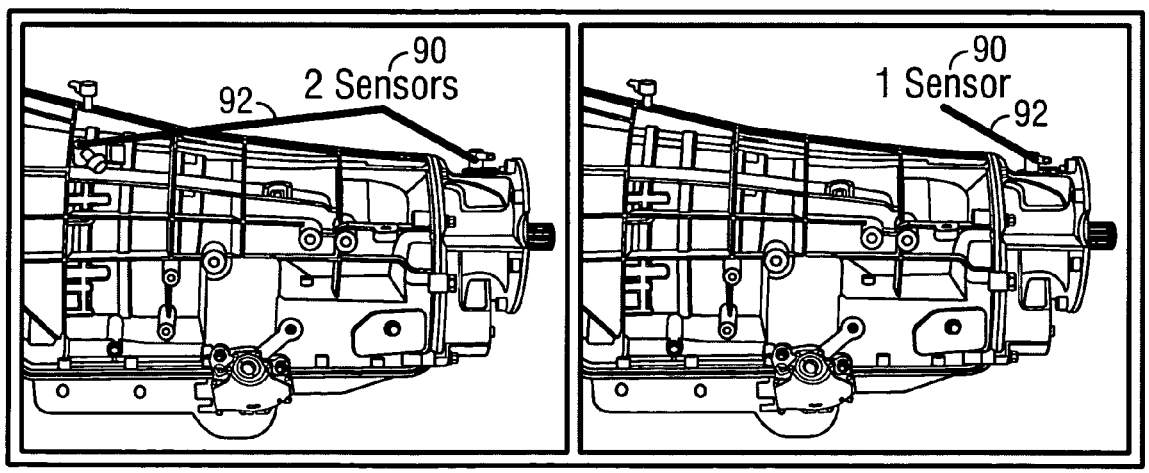
FIG. 4C is a Web page that corresponds to sets of options represented by boxes "Sensors (2)" and "Sensors (1)" of the classification scheme of FIGS. 2A-2G.
Figure 4D:
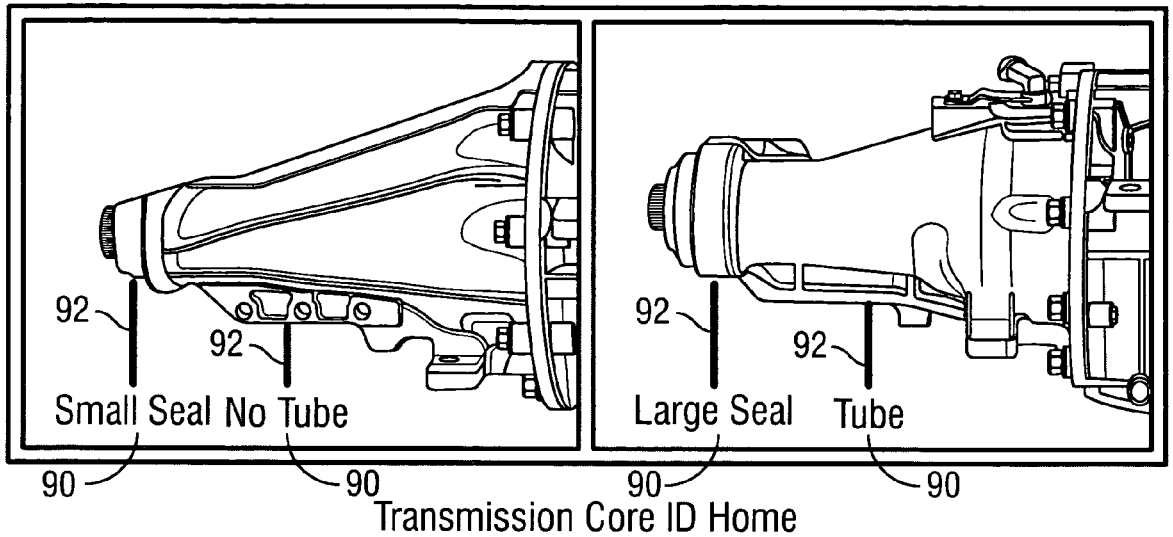
FIG. 4D is a Web page that corresponds to sets of options represented by boxes "Seal and tube (small, no)" and "Seal and tube (large, yes)" of the classification scheme of FIGS. 2A-2G.
Figure 4E:
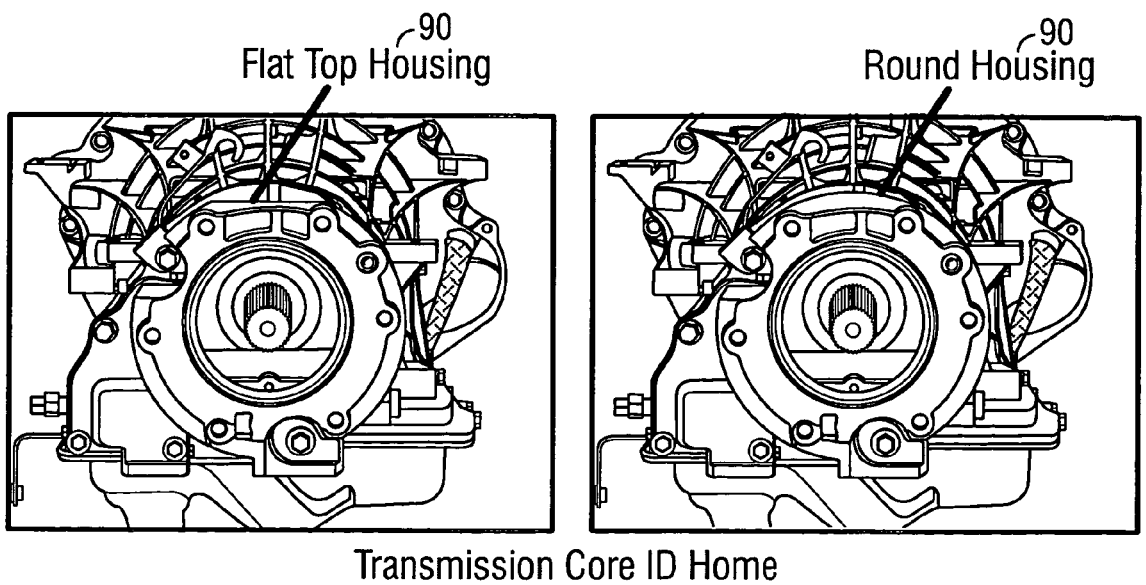
FIG. 4E is a Web page that corresponds to sets of options represented by boxes "Top housing (flat)" and "Top housing (round)" of the classification scheme of FIGS. 2A-2G.
Figure 4F:
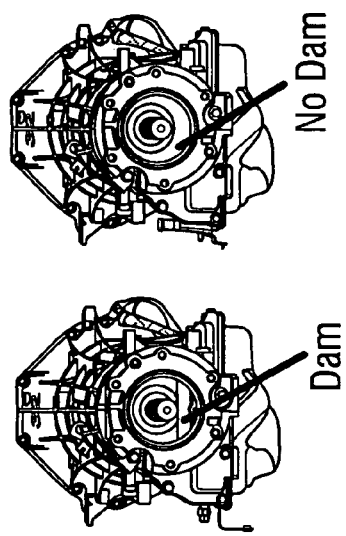
FIG. 4F is a Web page that corresponds to sets of options represented by boxes "Housing type (flat)," "Housing type (iron extension)" and "Housing type (no dam, one sensor)" of the classification scheme of FIGS. 2A-2G.
Figure 4F:
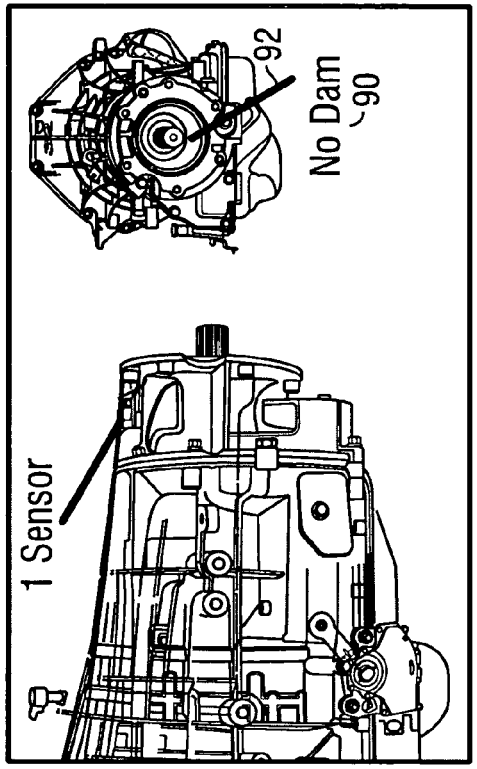
Figure 4F:
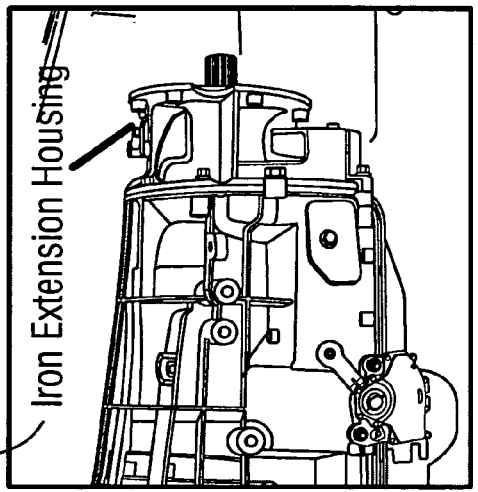
Figure 4F:
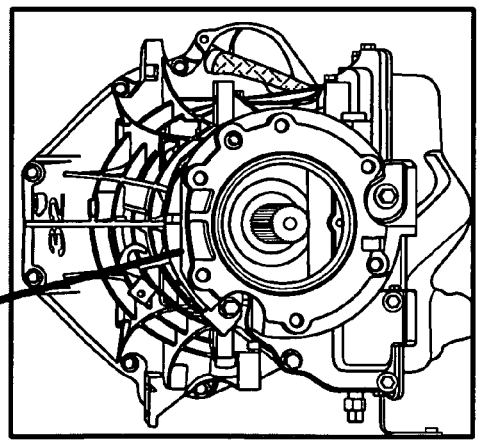
Figure 4G:
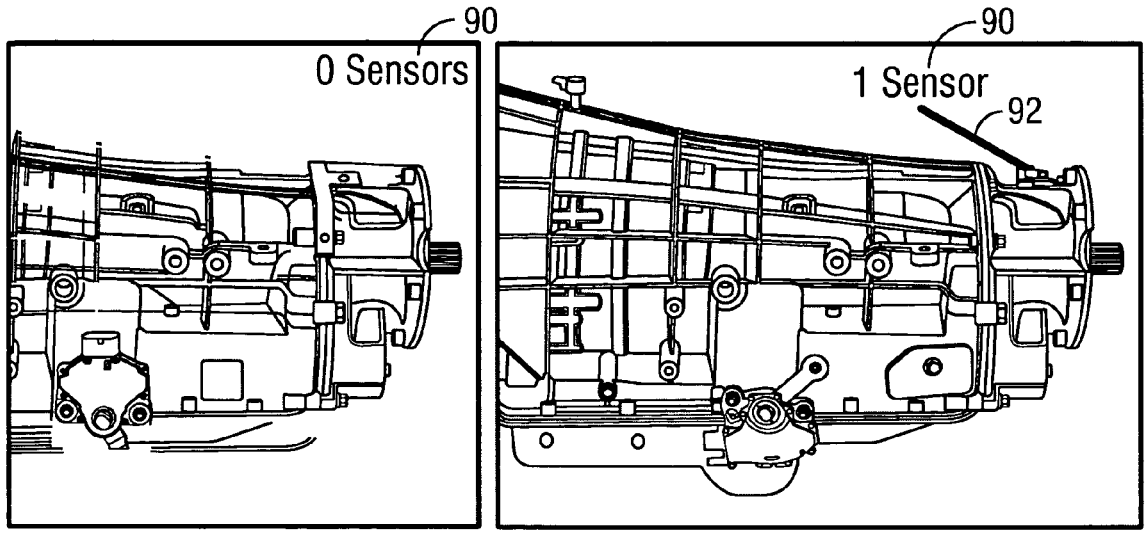
FIG. 4G is a Web page that corresponds to sets of options represented by boxes "Sensors (0)" and "Sensors (1)" of the classification scheme of FIGS. 2A-2G.
Figure 4H:
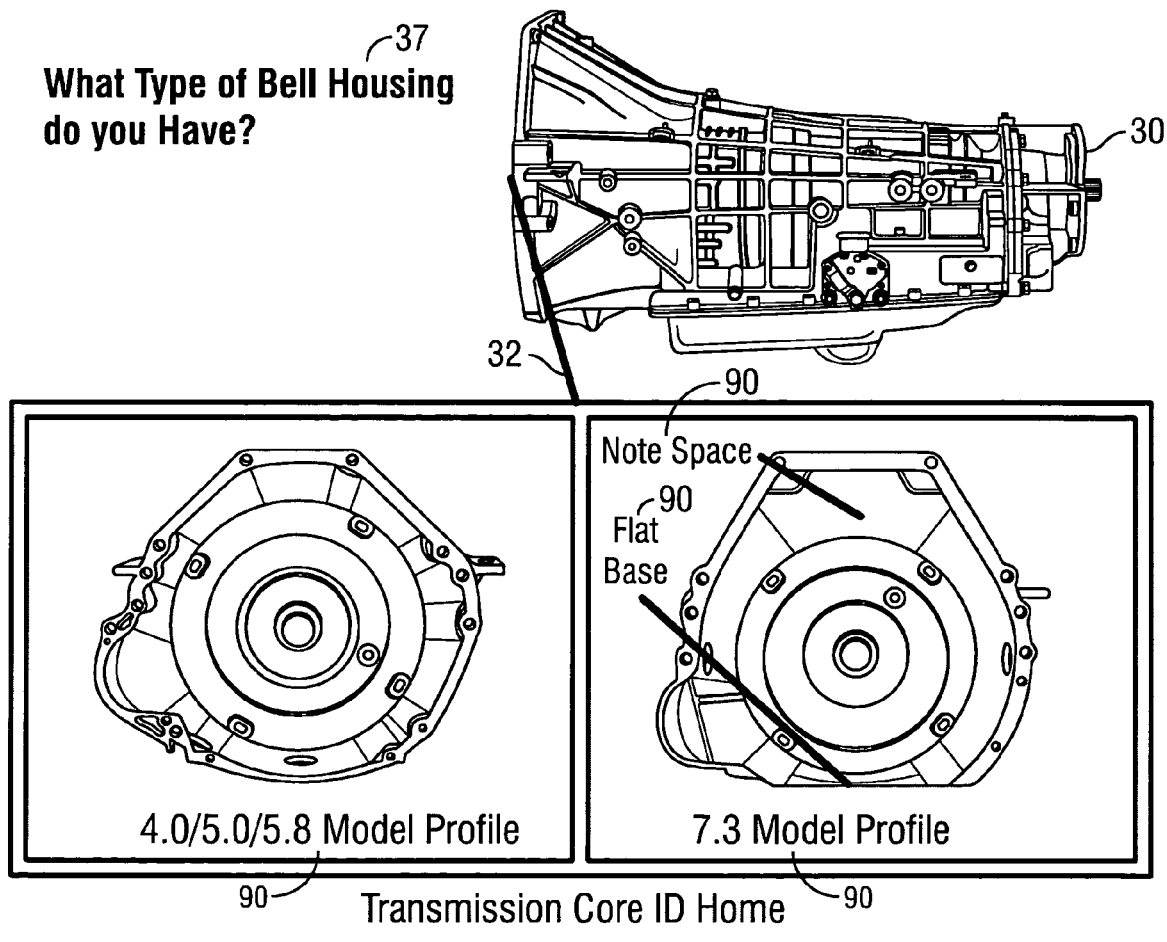
FIG. 4H is a Web page that corresponds to sets of options represented by boxes "Bell housing (space)" and "Bell housing (no space)" of the classification scheme of FIGS. 2A-2G.
Figure 4I:
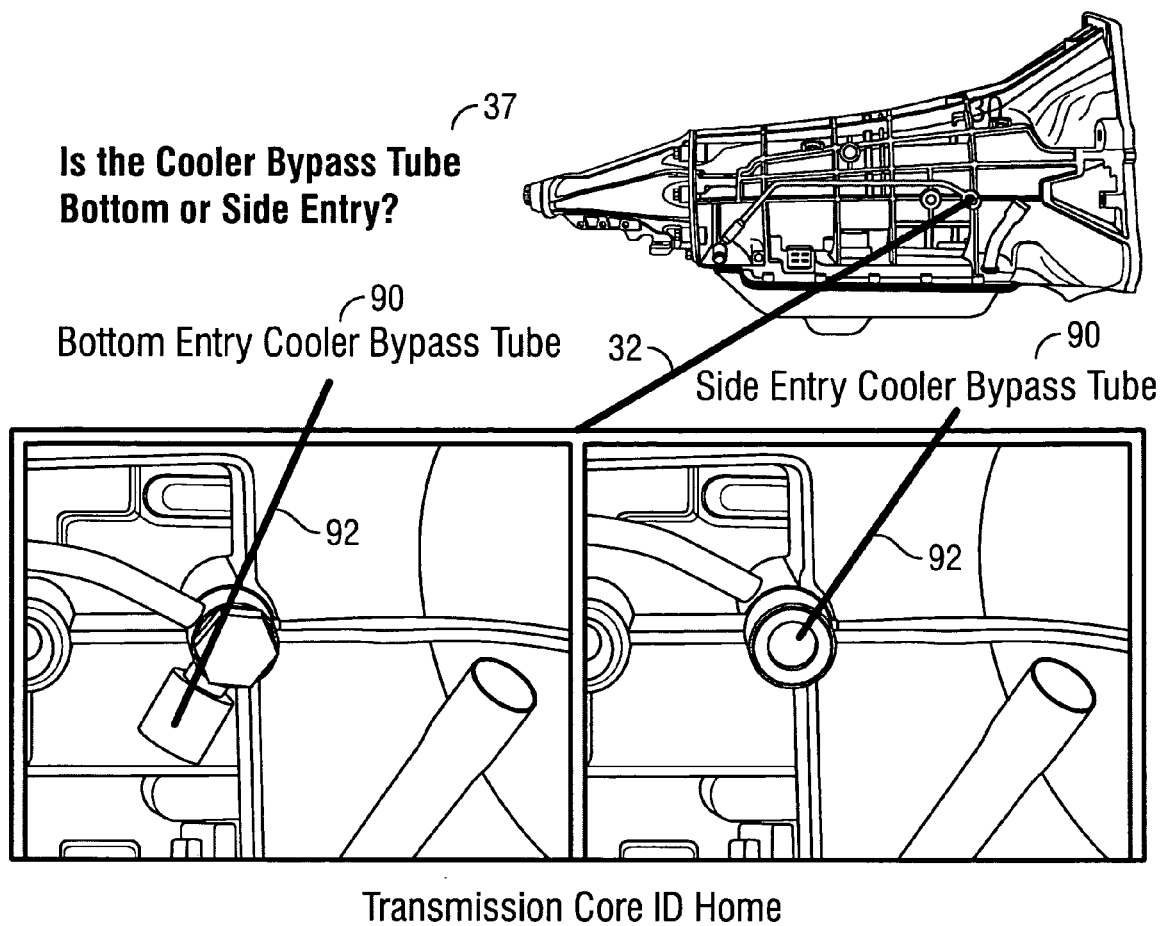
FIG. 4I is a Web page that corresponds to sets of options represented by boxes "Cooler bypass (bottom)" and "Cooler bypass (side)" of the classification scheme of FIGS. 2A-2G.
Figure 4J:
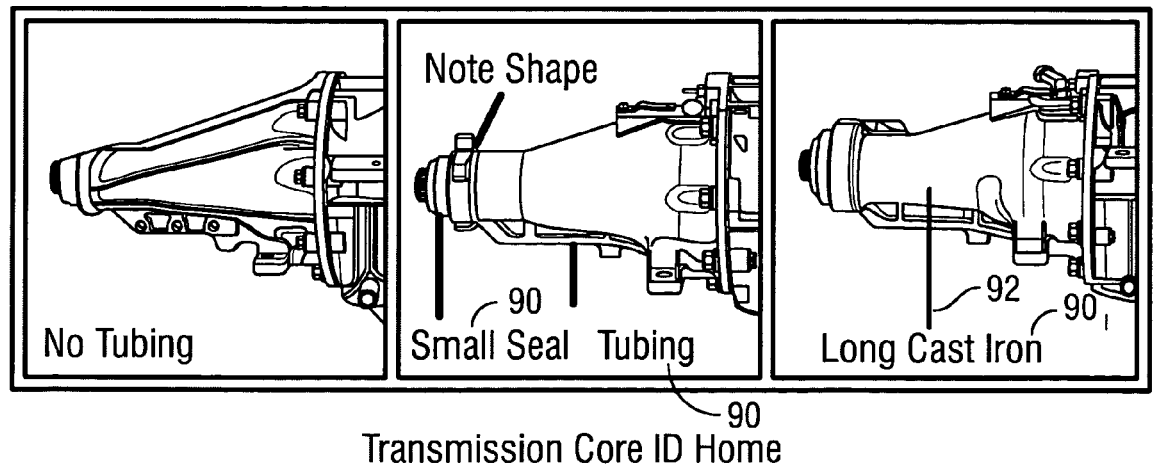
FIG. 4J is a Web page that corresponds to sets of options represented by boxes "Extension type (no tube)," "Extension type (small seal, tube)" and "Extension type (long cast iron)" of the classification scheme of FIGS. 2A-2G.
Figure 4K:
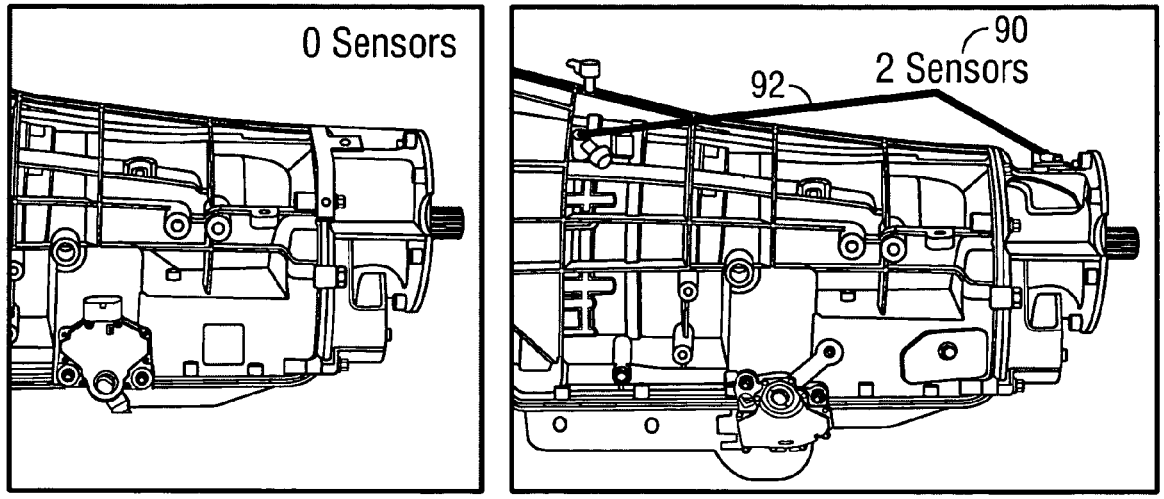
FIG. 4K is a Web page that corresponds to sets of options represented by boxes "Sensors (0)" and "Sensors (2)" of the classification scheme of FIGS. 2A-2G.
Figure 4L:
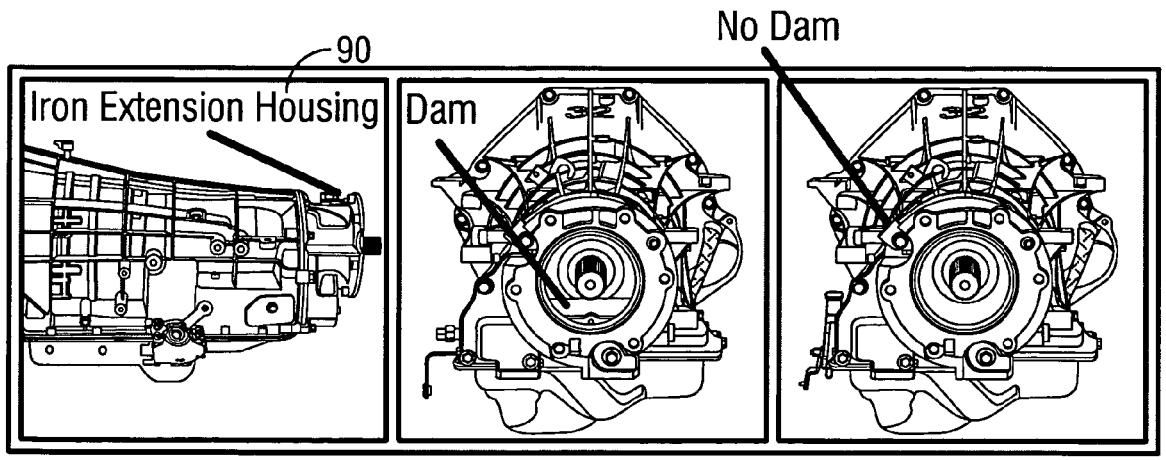
FIG. 4L is a Web page that corresponds to sets of options represented by boxes "Housing type (iron extension)," "Housing type (dam)" and "Housing type (no dam)" of the classification scheme of FIGS. 2A-2G.
Figure 4M:
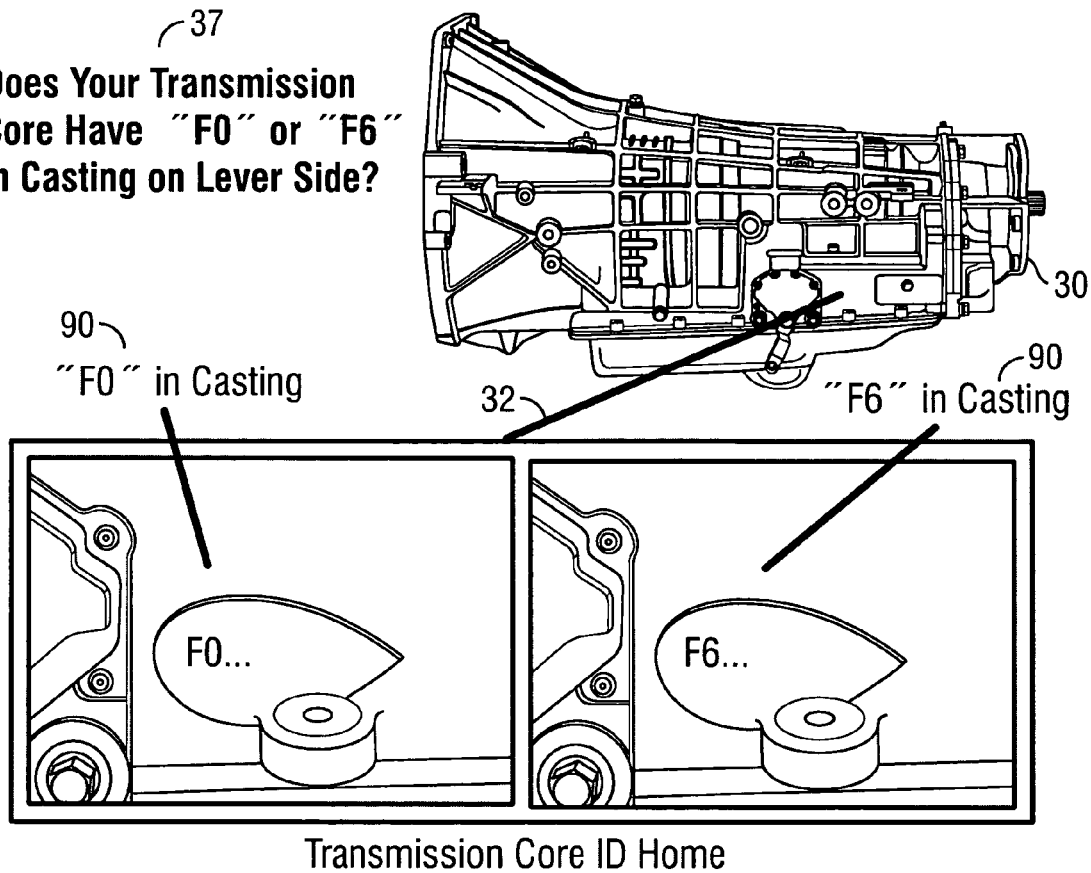
FIG. 4M is a Web page that corresponds to sets of options represented by boxes "Casting on lever side (F0)" and "Casting on lever side (F6)" of the classification scheme of FIGS. 2A-2G.
Figure 4N:
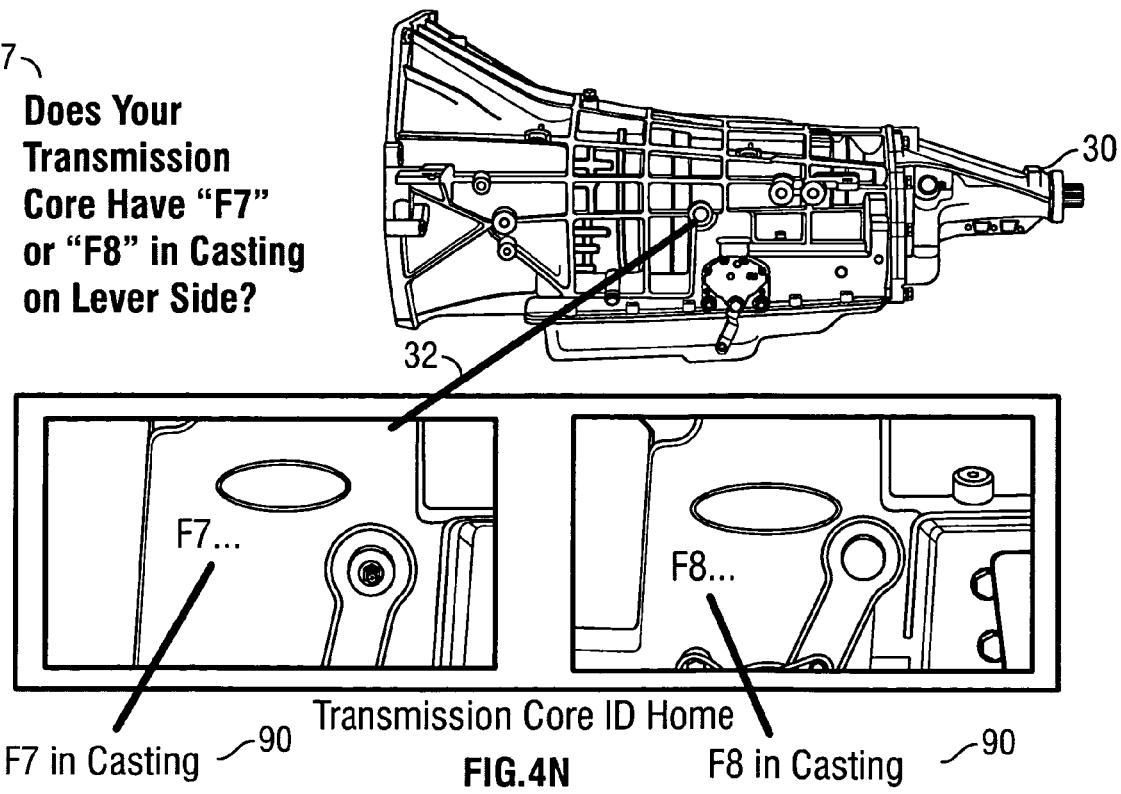
FIG. 4N is a Web page that corresponds to sets of options represented by boxes "Casting on lever side (F7)" and "Casting on lever side (F8)" of the classification scheme of FIGS. 2A-2G.
Figure 5A:
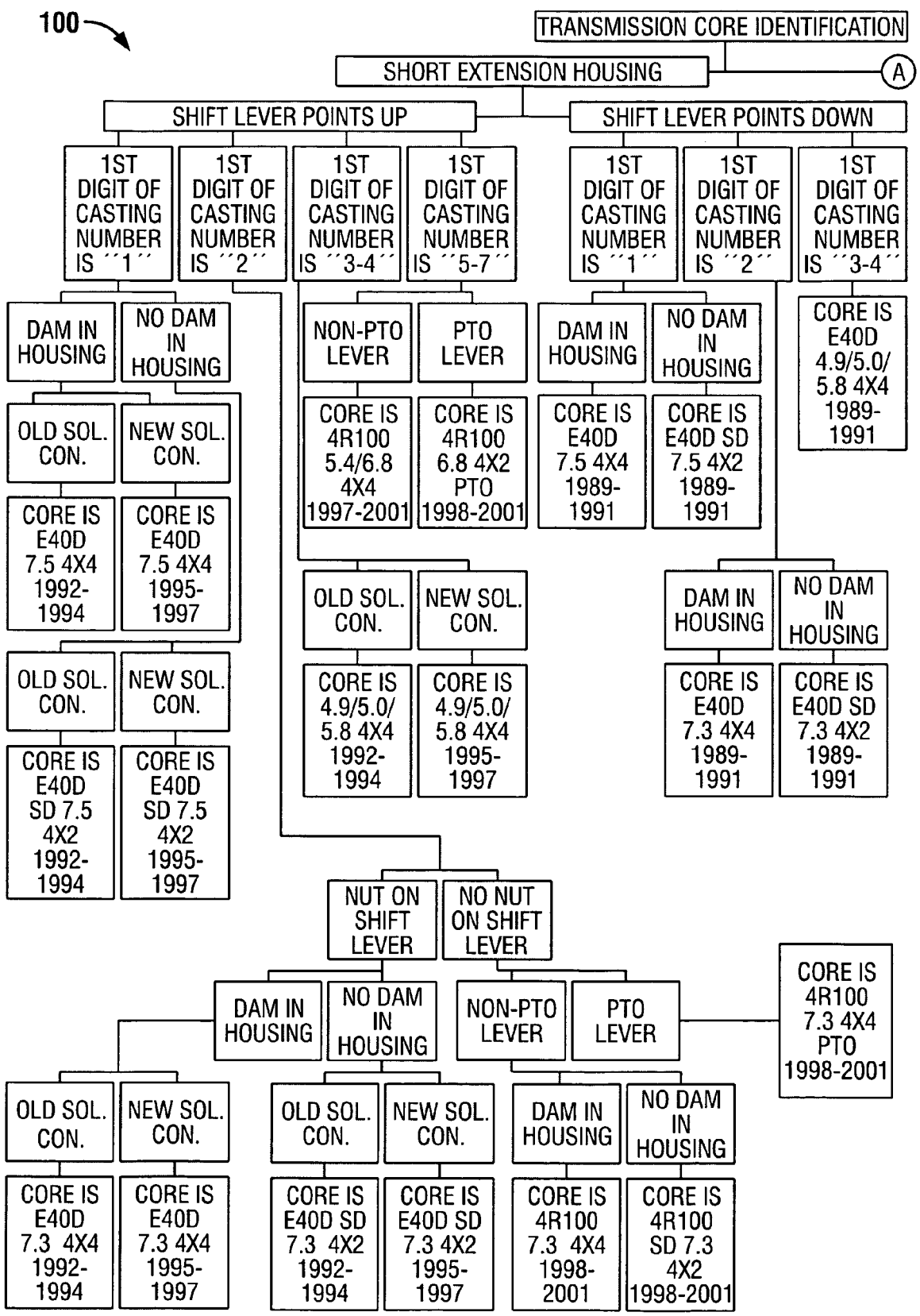
Figure 5B:
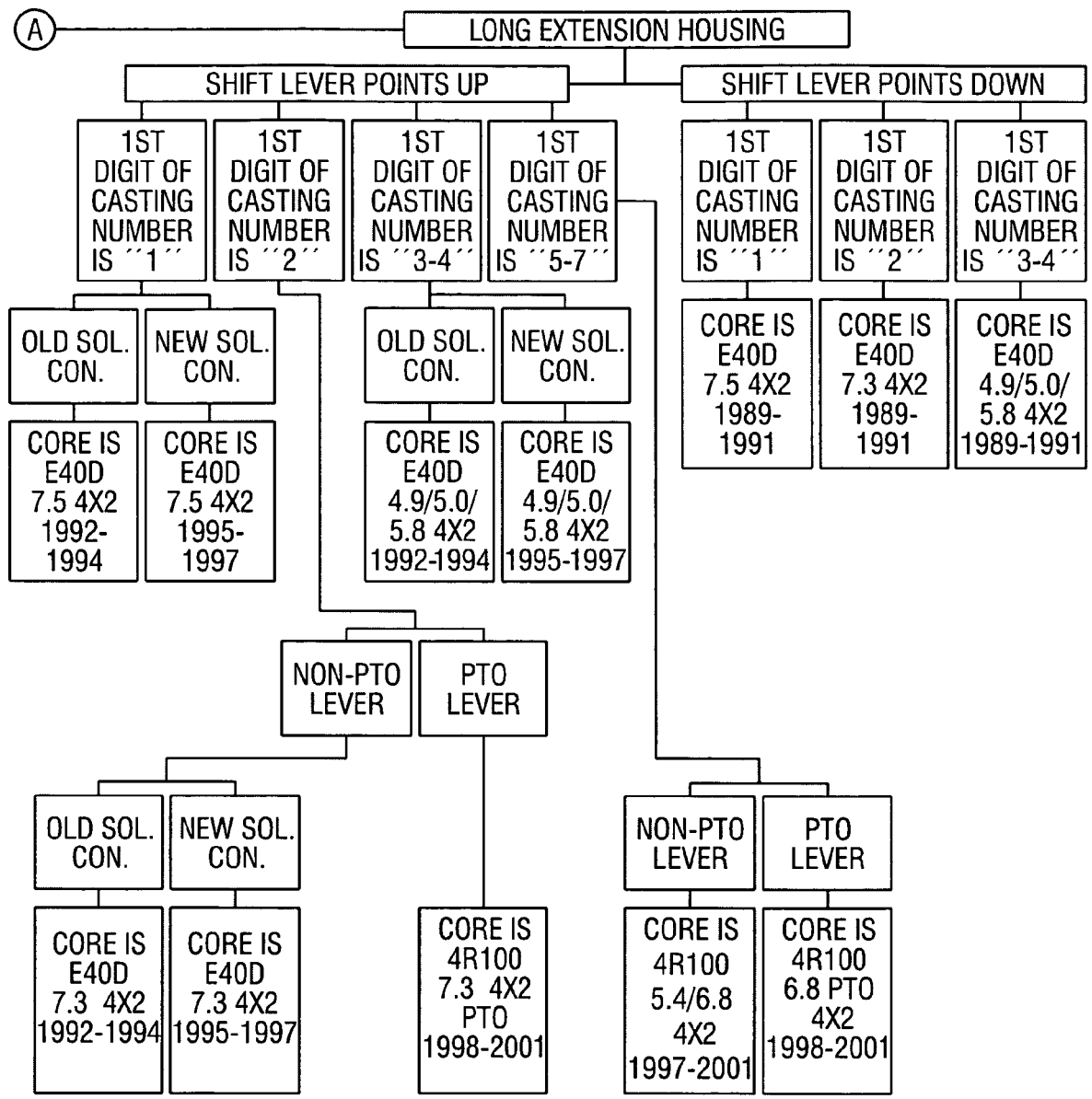

With reference now to FIGS. 4A-4N, all of the remaining Web pages for implementing the decision tree 18 are depicted. Each Web page presents one set of options directed to a characteristic for distinguishing the unknown transmission, and each set correlates to at least one set of options within the decision tree 18. For example, as referenced above in the description of the drawings, FIG. 4A corresponds to sets of options represented by boxes "Shift lever (PTO)" and "Shift lever (non PTO)" of the classification scheme of FIGS. 2A-2G. Preferably, the options of each set are presented in a manner to allow for side-by-side comparison. As appropriate, the Web pages include the transmission icon 30 and the reference line 32 pointing a portion of the transmission for locating the presented feature, and may include text 90 and visual cues 92 for distinguishing between different configurations of the presented feature, thereby allowing a user of minimal experience to successfully utilize the system.

Figures 2, 2F, 3, 4, 5:
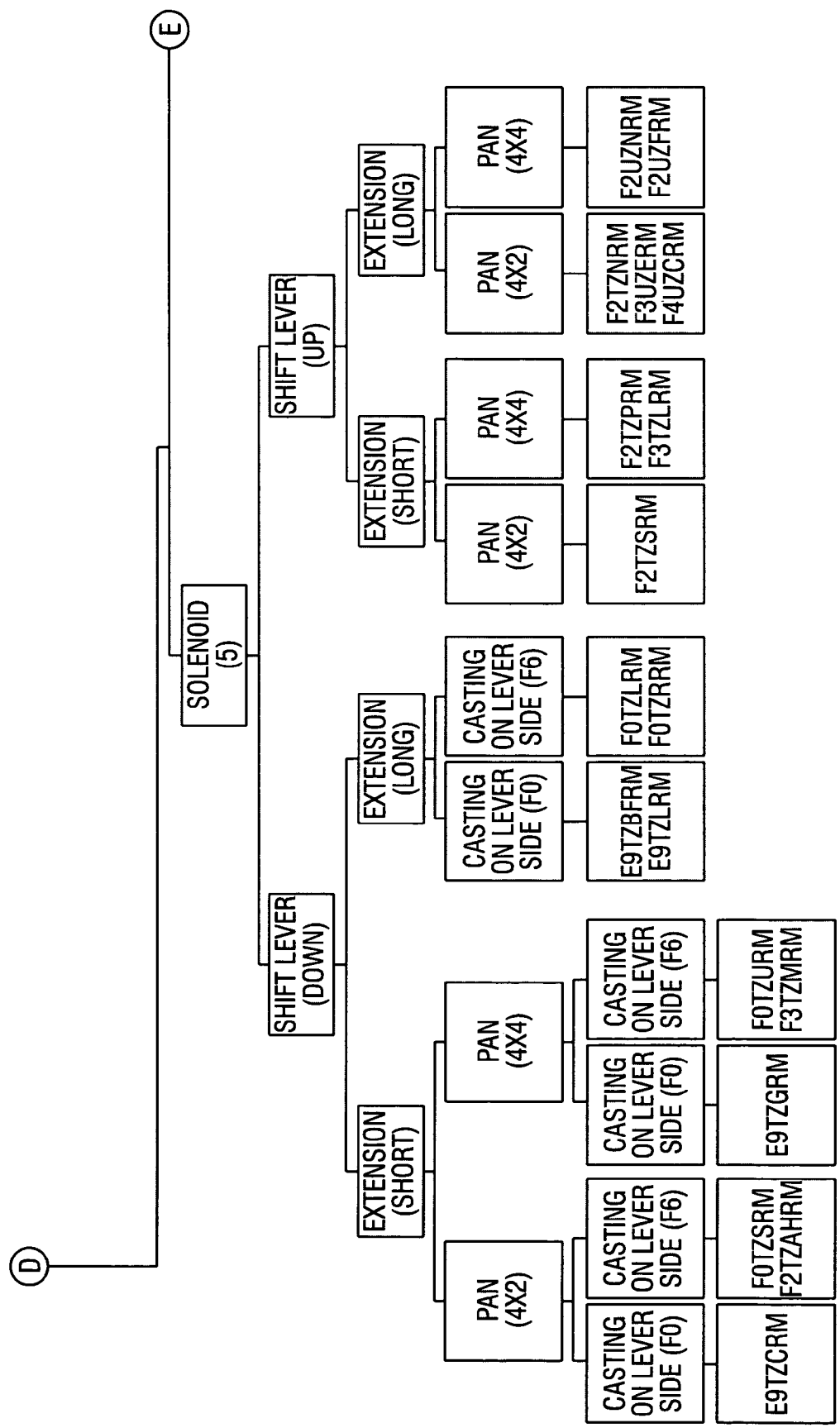
Figures 2, 2F, 3, 4, 5, 6:
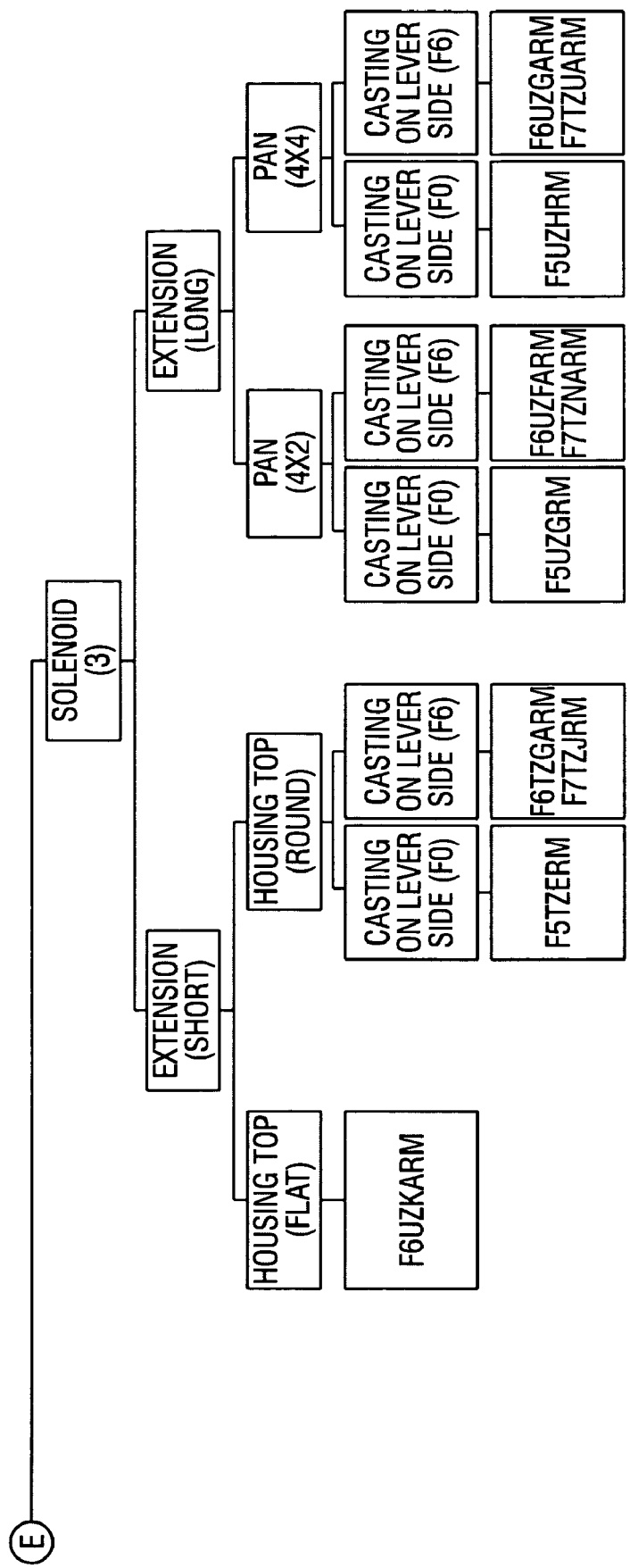
Figures 1, 2G:
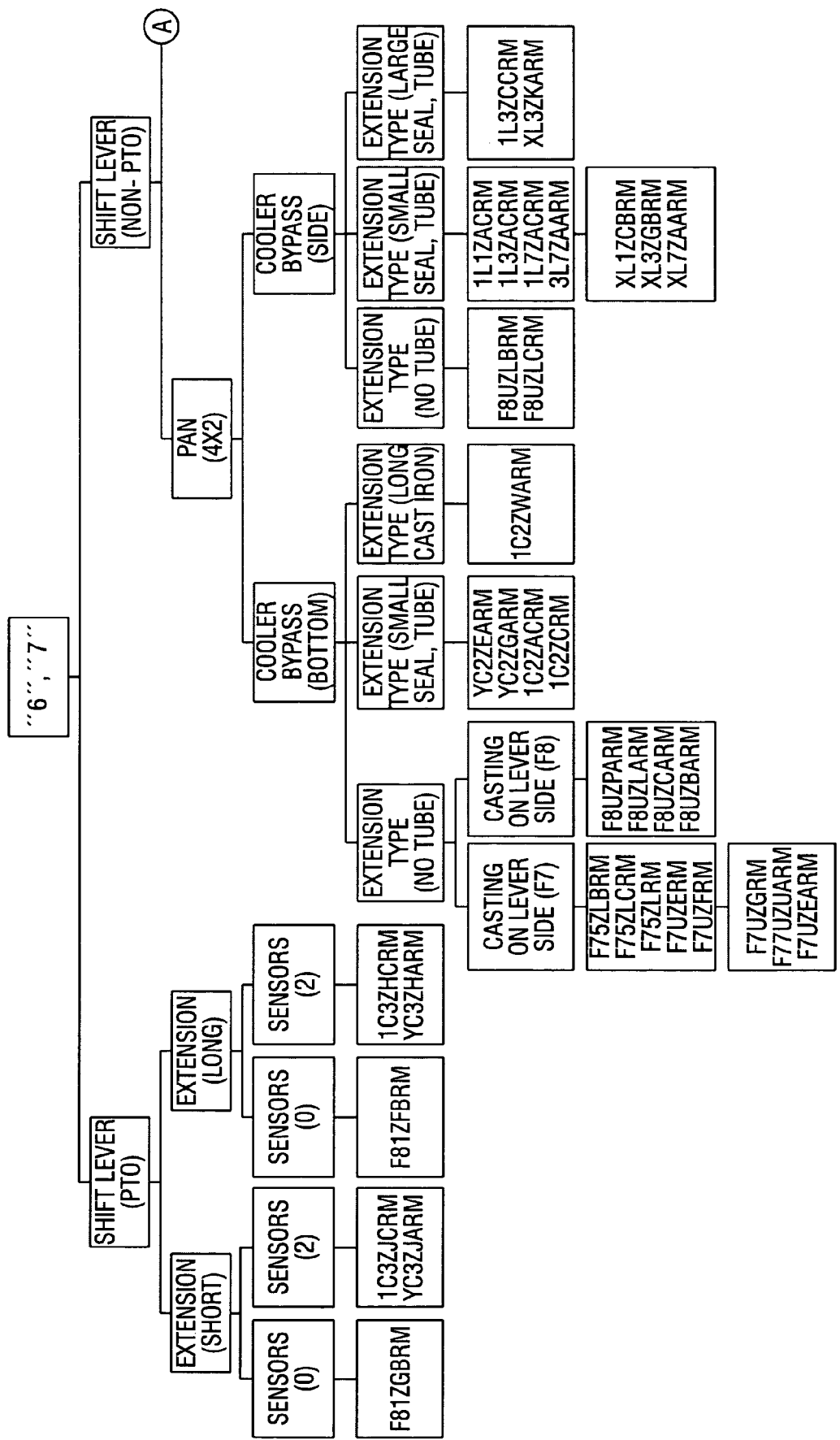
Figures 2, 2G:
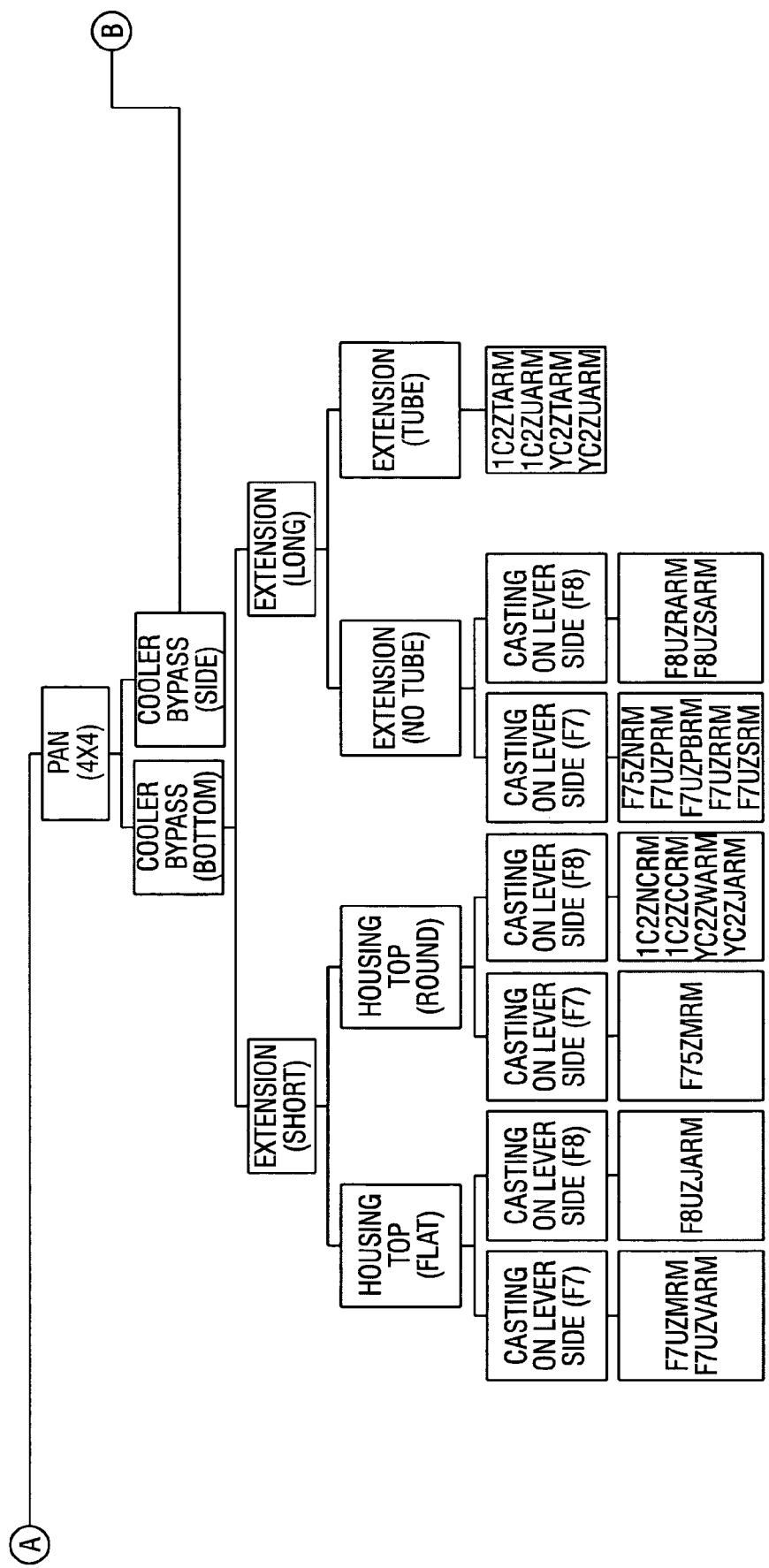
Figures 2, 2G, 3:
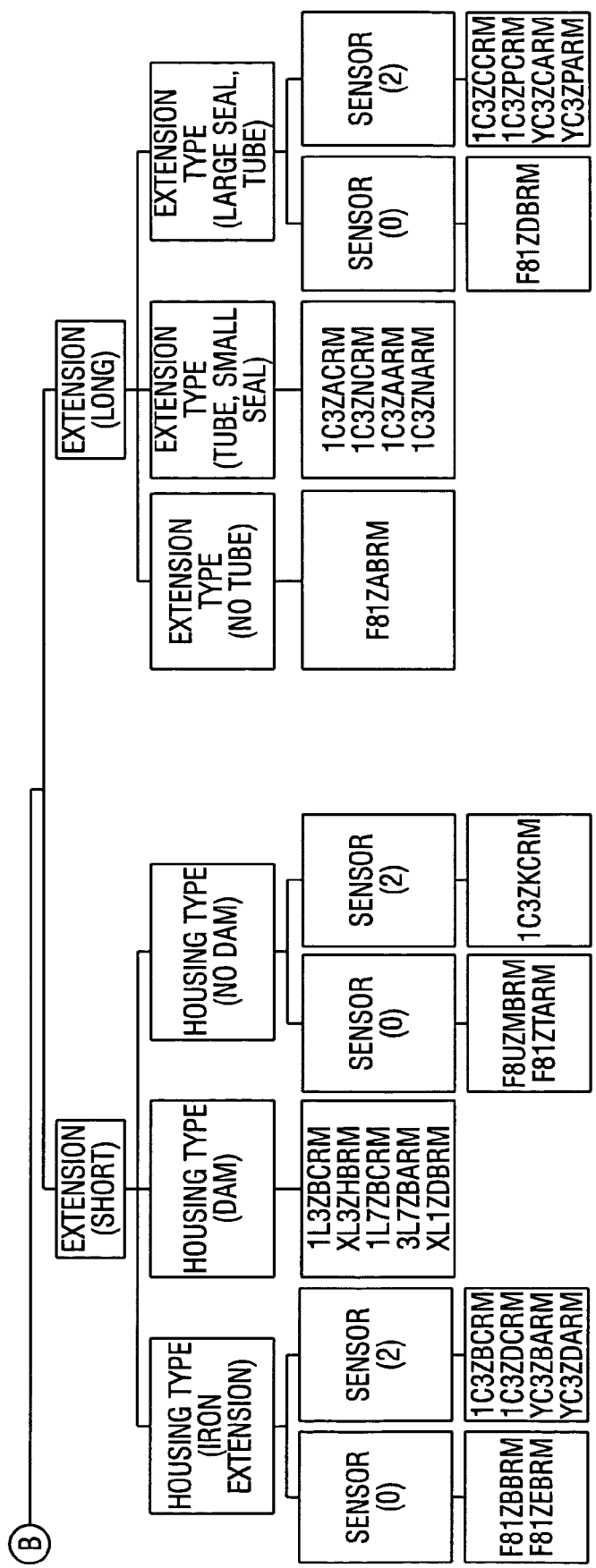

With reference now to FIG. 5, another preferred embodiment a decision tree 100 is presented. The decision tree is configured to identify same object class as addressed by decision tree 18 (FIGS. 2A-2G), namely, the object class consisting of E40D and 4R100 classifications of transmissions, as used in vehicles manufactured by the Ford Motor Company. However, the decision tree 100 classifies the transmissions into thirty-two distinct object classifications.

With reference again to FIG. 1, the user device 12 may be any Web-enabled device, such as a handheld device (e.g., a PalmPilot by 3Com Corporation), a personal computer or wireless telephone. The connections between these components are shown using a double-sided arrow and may be a physical, fiber optic, wireless, or any other type of link. Optionally, the Web site or other software embodiments of a classification scheme can be stored directly on the user device for interaction by a user.

It should be appreciated from the foregoing that the present invention provides an accurate and efficient system and method for efficiently identifying objects, such as transmission cores, through visual inspection of the unknown object without disassembly or need of substantial familiarity with the system or objects of the object class. Although the invention was described in detail with regard to transmissions, it is similarly applicable with regard to other objects, such as engine cores and brake assemblies.

The foregoing detailed description of the present invention is provided for the purposes of illustration and is not intended to be exhaustive or to limit the invention to the precise embodiments disclosed. Accordingly, the scope of the present invention is defined by the following claims.

We claim:

1. A method for identifying an unknown automotive part assembly from a class of automotive part assemblies using a prescribed classification scheme that distinguishes the unknown automotive part assembly from the class of automotive part assemblies based upon variations in the configuration of certain features, and that results in an ultimate determination of the identity of the unknown automotive part assembly, the method steps comprising:

(a) presenting on a terminal device, to a user in a computer user interface, a first set of options based upon the prescribed classification scheme, wherein the first set of options is directed to a first feature for distinguishing the unknown automotive part assembly from the class of automotive part assemblies, and wherein each option represents a distinct configuration of the first feature, and wherein the presentation of the first set of options includes at least one image of a representative feature and at least one visual reference in conjunction with the image for locating the first feature on the unknown automotive part assembly;

(b) receiving from the user a selection of one of the options from the first set of options that corresponds to the particular configuration of the feature found on the unknown automotive part assembly and generating a subsequent set of options based upon the selection;

(c) sequentially presenting for selection subsequent sets of options, wherein each set of subsequent options is based upon the previous selection and is directed to an additional distinguishing feature of the unknown automotive part assembly, wherein each option of the subsequent set of options represents a distinct configuration of the corresponding additional feature, and wherein the presentation of each set includes at least one image of a representative feature and a visual reference in conjunction with the image for physically locating the corresponding feature on the unknown automotive part assembly;

(d) receiving, from the user, a selection of one of the options from the subsequent set of options presented, the selection corresponding to the particular configuration of the feature found on the unknown automotive part assembly;

(e) if more information is required to identify the unknown automotive part assembly, repeating steps (c)-(d) to further identify the unknown automotive part assembly based upon the prescribed classification scheme; and (f) if no more information is required to identify the unknown automotive part assembly, presenting, to the user, an identification for the unknown automotive part assembly in accordance with the selections received.

2. The method of claim 1 wherein the classification scheme is configured in a decision tree structure.

3. The method of claim 2 wherein the class of automotive part assemblies is chosen from the group consisting of transmissions, engines, and brakes.

4. The method of claim 3 wherein the class of automotive part assemblies is transmissions and a first set of options is directed to a feature selected from a group consisting of shift lever orientation, bell-housing cast number, solenoid connection type, housing extension length, and lever-side cast number.

5. The method of claim 4 wherein each option of each set includes a visual depiction of the distinct configuration represented by the option, and each option further includes indicia for emphasizing distinctive characteristics of the option.

6. The method of claim 5 wherein each set is presented in the user interface such that the options are aligned for visual side-by-side comparison by the user.

7. A computer software program tangibly embodied in a computer readable medium, the program including machine-readable instructions executable by a computer processor for performing a method for identifying an unknown object of a class of objects using a prescribed classification scheme that results in an ultimate determination of the identity of the unknown object, the program steps comprising:
 (a) presenting to a user in a computer user interface a first set of options based upon the prescribed classification scheme, wherein the first set of options is directed to a first feature for distinguishing the unknown automotive part assembly from the class of automotive part assemblies, and wherein each option represents a distinct configuration of the first feature, and wherein the presentation of the first set of options includes at least one image of a representative feature and at least one visual reference in conjunction with the image for locating the first feature on the unknown automotive part assembly;
 (b) receiving from the user a selection of one of the options from the first set of options that corresponds to the particular configuration of the feature found on the unknown automotive part assembly and generating a subsequent set of options based upon the selection;
 (c) sequentially presenting for selection subsequent sets of options, wherein each set of subsequent options is based upon the previous selection and is directed to an additional distinguishing feature of the unknown automotive part assembly, wherein each option of the subsequent set of options represents a distinct configuration of the corresponding additional feature, and wherein the presentation of each set includes at least one image of a representative feature and a visual reference in conjunction with the image for physically locating the corresponding feature on the unknown automotive part assembly;
 (d) receiving, from the user, a selection of one of the options from the subsequent set of options presented, the selection corresponding to the particular configuration of the feature found on the unknown automotive part assembly;
 (e) if more information is required to identify the unknown automotive part assembly, repeating steps (c)-(d) to further identify the unknown automotive part assembly based upon the prescribed classification scheme; and
 (f) if no more information is required to identify the unknown automotive part assembly, presenting, to the user, an identification for the unknown automotive part assembly in accordance with the selections received.

8. The computer software program of claim 7 wherein the classification scheme is configured in a decision tree structure.

9. The computer software program of claim 8 wherein the class of automotive part assemblies is chosen from the group consisting of transmissions, engines, and brakes.

10. The computer software program of claim 9 wherein the class of automotive part assemblies is transmissions and a first set of options is directed to a feature selected from a group consisting of shift lever orientation, bell-housing cast number, solenoid connection type, housing extension length, and lever-side cast number.

11. The computer software program of claim 10 wherein each option of each set includes a visual depiction of the distinct configuration represented by the option, and each option further includes indicia for emphasizing distinctive characteristics of the option.

12. The computer software program of claim 11 wherein each set is presented in the user interface such that the options are aligned for visual side-by-side comparison by the user.

13. A system for identifying an unknown object of a class of objects using a prescribed classification scheme that results in an ultimate determination of the identity of the unknown object, the system comprising:
 a database containing sets of options for distinguishing configuration features among the automotive part assemblies that make up the class of automotive part assemblies;
 a networked computing device, the computing device having access to the database, the computing device executing stored program code, the program steps comprising:
  (a) presenting to a user in a computer user interface a first set of options based upon the prescribed classification scheme, wherein the first set of options is directed to a first feature for distinguishing the unknown automotive part assembly from the class of automotive part assemblies, and wherein each option represents a distinct configuration of the first feature, and wherein the presentation of the first set of options includes at least one image of a representative feature and at least one visual reference in conjunction with the image for locating the first feature on the unknown automotive part assembly;
  (b) receiving from the user a selection of one of the options from the first set of options that corresponds to the particular configuration of the feature found on the unknown automotive part assembly and generating a subsequent set of options based upon the selection;
  (c) sequentially presenting for selection subsequent sets of options, wherein each set of subsequent options is based upon the previous selection and is directed to an additional distinguishing feature of the unknown automotive part assembly, wherein each option of the subsequent set of options represents a distinct configuration of the corresponding additional feature, and wherein the presentation of each set includes at least one image of a representative feature and a visual reference in conjunction with the image for physically locating the corresponding feature on the unknown automotive part assembly;
  (d) receiving, from the user, a selection of one of the options from the subsequent set of options presented, the selection corresponding to the particular configuration of the feature found on the unknown automotive part assembly;
  (e) if more information is required to identify the unknown automotive part assembly, repeating steps (c)-(d) to further identify the unknown automotive part assembly based upon the prescribed classification scheme; and
  (f) if no more information is required to identify the unknown automotive part assembly, presenting, to the user, an identification for the unknown automotive part assembly in accordance with the selections received.

14. The system of claim 13 wherein the classification scheme is configured in a decision tree structure.

15. The system of claim 14 wherein the class of automotive part assemblies is chosen from the group consisting of transmissions, engines, and brakes.

16. The system of claim 15 wherein the class of automotive part assemblies is transmissions and a first set of options is directed to a feature selected from a group consisting of shift lever orientation, bell-housing cast number, solenoid connection type, housing extension length, and lever-side cast number.

17. The system of claim 16 wherein each option of each set includes a visual depiction of the distinct configuration represented by the option, and each option further includes indicia for emphasizing distinctive characteristics of the option.

18. The system of claim 17 wherein each set is presented in the user interface such that the options are aligned for visual side-by-side comparison by the user.

* * * * *

UNITED STATES PATENT AND TRADEMARK OFFICE
CERTIFICATE OF CORRECTION

PATENT NO.       : 7,529,697 B2                                         Page 1 of 1
APPLICATION NO.  : 10/444462
DATED            : May 5, 2009
INVENTOR(S)      : David Miles et al.

It is certified that error appears in the above-identified patent and that said Letters Patent is hereby corrected as shown below:

In the Claims:
Column 12, Claim 13, line 14, please add --capable of-- to read "the computing device capable of executing stored program code".

Signed and Sealed this

Fourth Day of August, 2009

JOHN DOLL
*Acting Director of the United States Patent and Trademark Office*